US010773788B2

(12) United States Patent
Best et al.

(10) Patent No.: US 10,773,788 B2
(45) Date of Patent: Sep. 15, 2020

(54) FAIRING ASSEMBLY AND METHOD THEREFOR

(71) Applicant: The Boeing Company, Chicago, IL (US)

(72) Inventors: Michael J. Best, Hermosa Beach, CA (US); Jonathan D. Embler, Tustin, CA (US); John S. Kruse, Florissant, MO (US); Thomas R. Pinney, Long Beach, CA (US); Drew L. Smallwood, Long Beach, CA (US)

(73) Assignee: The Boeing Company, Chicago, IL (US)

(*) Notice: Subject to any disclaimer, the term of this patent is extended or adjusted under 35 U.S.C. 154(b) by 384 days.

(21) Appl. No.: 15/677,789

(22) Filed: Aug. 15, 2017

(65) Prior Publication Data

US 2019/0054998 A1 Feb. 21, 2019

(51) Int. Cl.

| | |
|---|---|
| ***B64C 1/40*** | (2006.01) |
| ***B64C 7/00*** | (2006.01) |
| ***B64C 1/38*** | (2006.01) |
| ***B64G 1/58*** | (2006.01) |
| ***B64G 1/14*** | (2006.01) |
| ***B64G 1/00*** | (2006.01) |

(52) U.S. Cl.

CPC ................ *B64C 1/38* (2013.01); *B64C 1/403* (2013.01); *B64G 1/002* (2013.01); *B64G 1/14* (2013.01); *B64G 1/58* (2013.01); *B64C 7/00* (2013.01)

(58) Field of Classification Search

CPC ........... B64G 1/402; B64C 1/069; B64C 1/26; B64C 1/40; B64C 1/403; B64C 7/00; B64C 3/18; B64C 3/185; B64D 29/06; F16J 15/02; F16J 15/08; F16J 15/0887; F16J 15/12

See application file for complete search history.

(56) References Cited

U.S. PATENT DOCUMENTS

| | | | | |
|---|---|---|---|---|
| 6,193,187 | B1 * | 2/2001 | Scott | B64G 1/14 244/159.3 |
| 9,211,960 | B2 | 12/2015 | Embler et al. | |
| 2003/0066933 | A1 | 4/2003 | Maury et al. | |
| 2006/0065784 | A1 | 3/2006 | Rouyre | |
| 2009/0146007 | A1 * | 6/2009 | Keeler, Jr. | B64C 1/26 244/119 |

(Continued)

FOREIGN PATENT DOCUMENTS

| | | |
|---|---|---|
| FR | 2836890 | 9/2003 |
| FR | 2936489 | 4/2018 |
| WO | 0043267 | 7/2000 |

OTHER PUBLICATIONS

European Search Report, European Application No. 18175945 dated Sep. 26, 2018.

*Primary Examiner* — Nicholas McFall
*Assistant Examiner* — Terri L Filosi
(74) *Attorney, Agent, or Firm* — Perman & Green LLP

(57) ABSTRACT

A fairing assembly for an aerial vehicle having a tank that forms a body of the vehicle and a wing coupled to the tank is provided. The fining assembly includes a substructure configured to couple with a tank skin of the tank, a thermal protection system coupled to the substructure, and a seal assembly coupled to the substructure, the seal assembly being configured to overlap at least a portion of an edge of the wing.

20 Claims, 17 Drawing Sheets

(56) References Cited

U.S. PATENT DOCUMENTS

| | | | | |
|---|---|---|---|---|
| 2010/0170987 | A1 | 7/2010 | Meyer | |
| 2016/0185438 | A1* | 6/2016 | Rouyre | B64C 1/064 244/119 |
| 2017/0036751 | A1 | 2/2017 | Topf et al. | |
| 2017/0174315 | A1 | 6/2017 | Neal et al. | |

* cited by examiner 110
112
308
118
114
114A
378
202
122
120
X 232
202
190
174
114

168
260
268
262
306
312
318
302
304
266
166A
118
168
112
166A
302
166B
204
208
220
168
208
174
110

FAIRING ASSEMBLY AND METHOD THEREFOR

BACKGROUND

1. Field

The aspects of the present disclosure generally relate to a fairing assembly for an aerial vehicle and more particularly a fairing assembly and method for an aerial vehicle.

2. Brief Description of Related Developments

Winged launch vehicles and hypersonic vehicles have the potential to significantly reduce recurring launch costs by enabling reusability. One possible winged launch vehicle concept involves separating the wing and body into separate subassemblies, where pressurized fuel tanks constitute part of the primary structure of the body. In this configuration, thermal and elastic strains in the wing and body induced during operation result in large relative deflections, such as a relative growth. This relative growth complicates the design of fairings at wing to body interfaces, which are designed to produce an aerodynamically smooth vehicle outer mold line. Fairings for these types of applications are generally designed to prevent airflow from entering internal cavities of the vehicle through the use of high-temperature seals. In addition, the outer surfaces of fairings are generally designed to withstand temperatures of up to about 1700 degrees Fahrenheit (about 926 degrees Celsius), and generally have smooth surfaces (e.g., few or no steps or gaps) to reduce aerodynamic and/or aeroheating issues.

Fairings for conventional launch vehicle designs, such as United States National Aeronautics and Space Administration's Space Shuttle, do not have the same technical challenges regarding differential growth management compared to the above mentioned winged launch vehicles and hypersonic vehicles. The fairings on the conventional launch vehicle designs are typically attached with fasteners between two adjacent structures that are not designed to move relative to each other. In addition, fairing attachments on the conventional launch vehicle designs are typically limited to dry structures.

If sealing is required, fairings generally include a high-temperature perimeter edge seal that is compressed upon installation. These high-temperature perimeter edge seals are typically made of a combination of high-temperature fabrics, battings, and metallic spring tubes or foils. However, these sealing concepts are generally not designed to function between surfaces with large amounts of relative movement.

In addition, launch vehicles typically require some type of thermal protection system to reduce the temperatures of underlying structures to an acceptable range. For fairings, such as those on conventional launch vehicles, the thermal protection system generally includes ceramic blankets that are bonded to the outer surface of the fairing and the adjacent structure such that a smooth outer mold line is produced.

SUMMARY

The following is a non-exhaustive list of examples, which may or may not be claimed, of the subject matter according to the present disclosure.

One example of the subject matter according to the present disclosure relates to a fairing assembly for an aerial vehicle having a tank that forms a body of the vehicle and a wing coupled to the tank, the fairing assembly comprising: a substructure configured to couple with a tank skin of the tank; a thermal protection system coupled to the substructure; and a seal assembly coupled to the substructure, the seal assembly being configured to overlap at least a portion of an edge of the wing.

Another example of the subject matter according to the present disclosure relates to an aerial vehicle comprising: a tank forming at least a portion of a body of the vehicle, the tank having a tank skin; a wing coupled to the tank, the wing having an edge at least partially defined by a wing skin; and a fairing assembly coupled to the tank adjacent the edge of the wing, the fairing assembly comprising: a substructure configured to couple with the tank skin; a thermal protection system coupled to the substructure; and a seal assembly coupled to the substructure, the seal assembly being configured to overlap at least a portion of the edge of the wing.

Still another example of the subject matter according to the present disclosure relates to a method for coupling a fairing assembly to an aerial vehicle having a tank that forms a body of the vehicle and a wing coupled to the tank, the method comprising: coupling a substructure of the fairing assembly to the tank so that tank reaction loads, resulting from the fairing assembly, are hoop-wise reaction loads; coupling a thermal protection system to the substructure; and coupling a seal assembly to the substructure so that the seal assembly overlaps at least a portion of an edge of the wing.

BRIEF DESCRIPTION OF THE DRAWINGS

Figure 1:
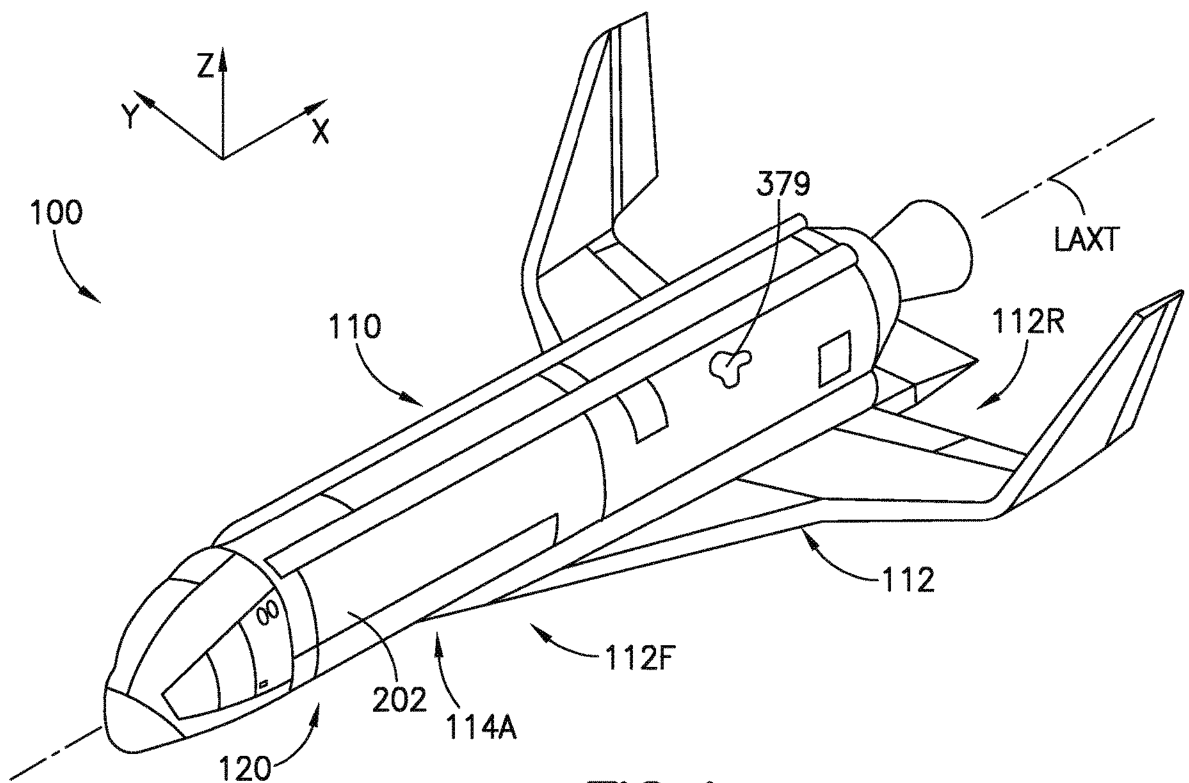
Figure 2:
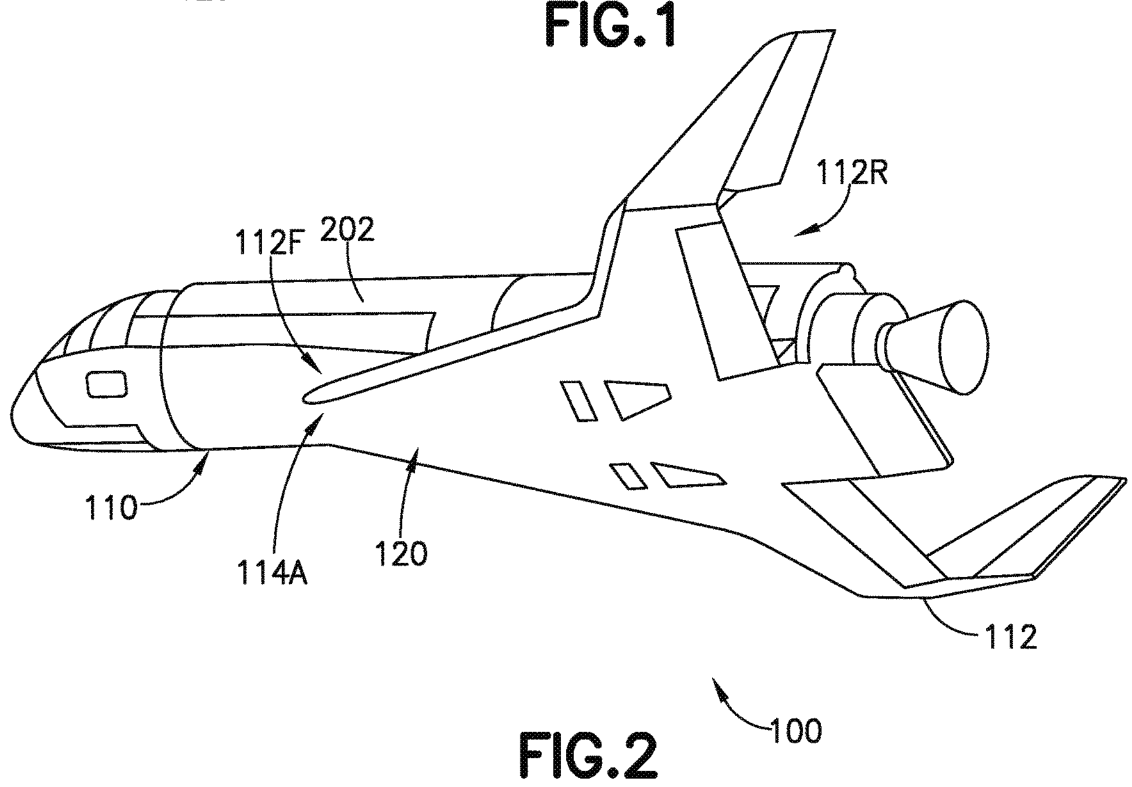
Figure 3:
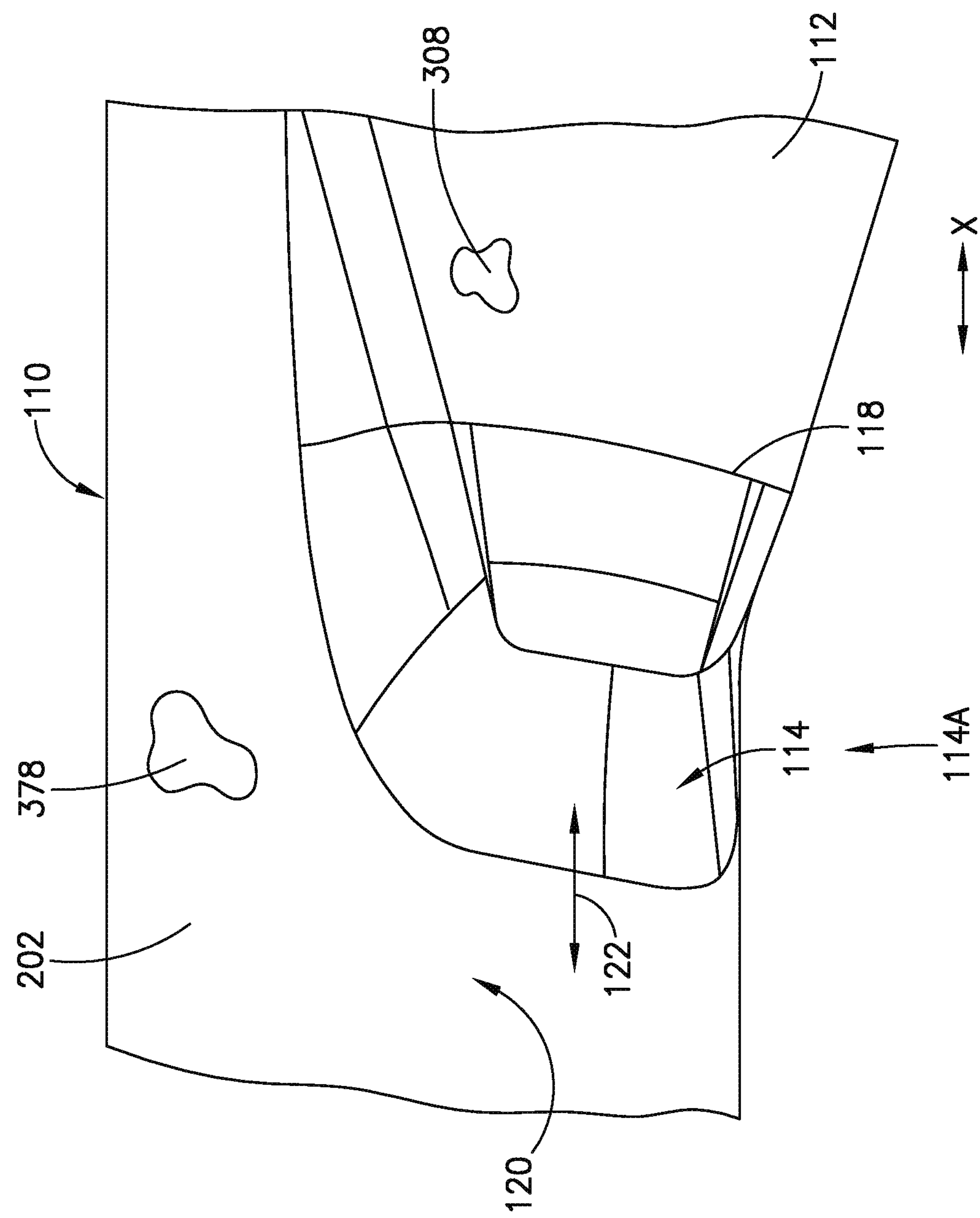
Figure 4:
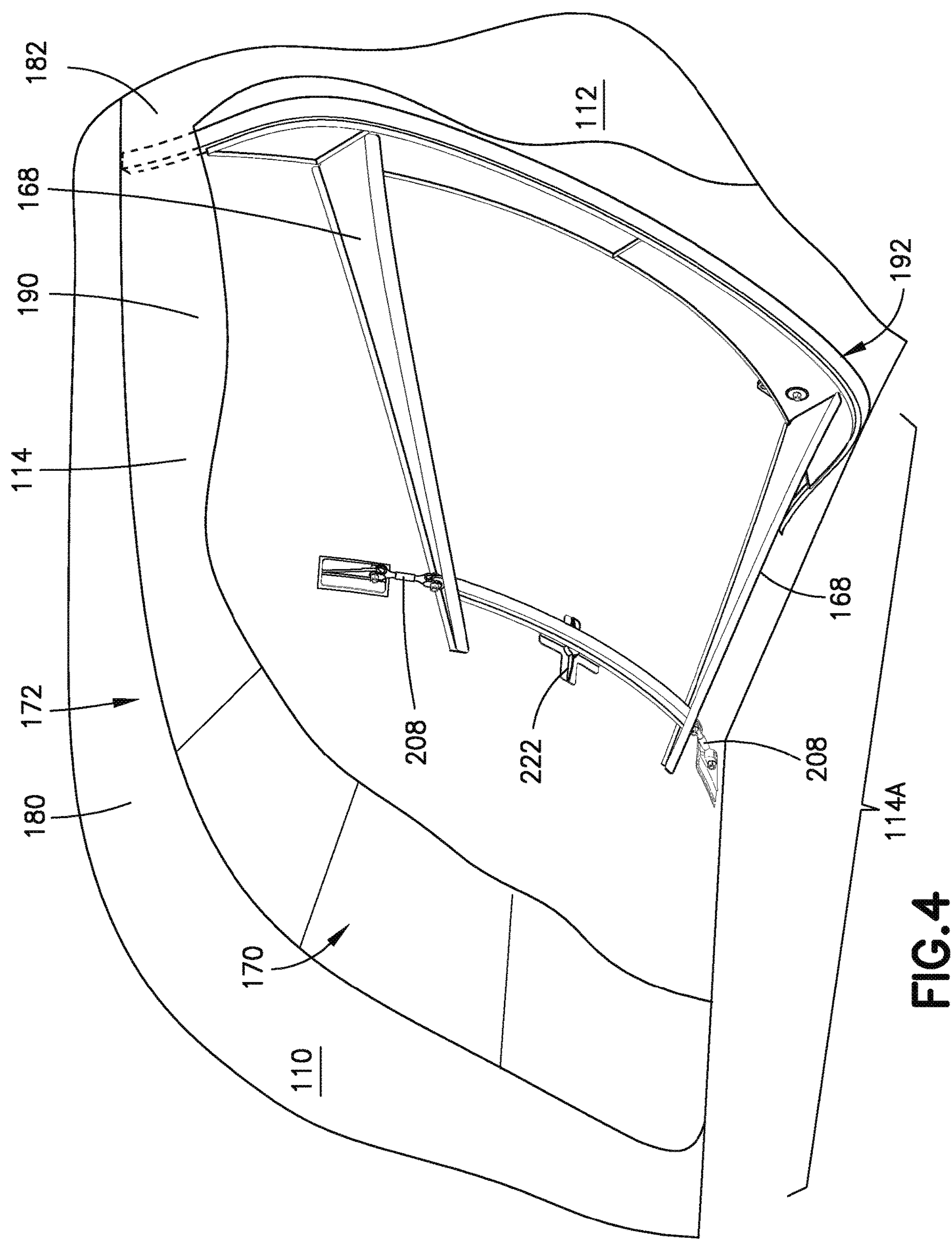
Figure 5:
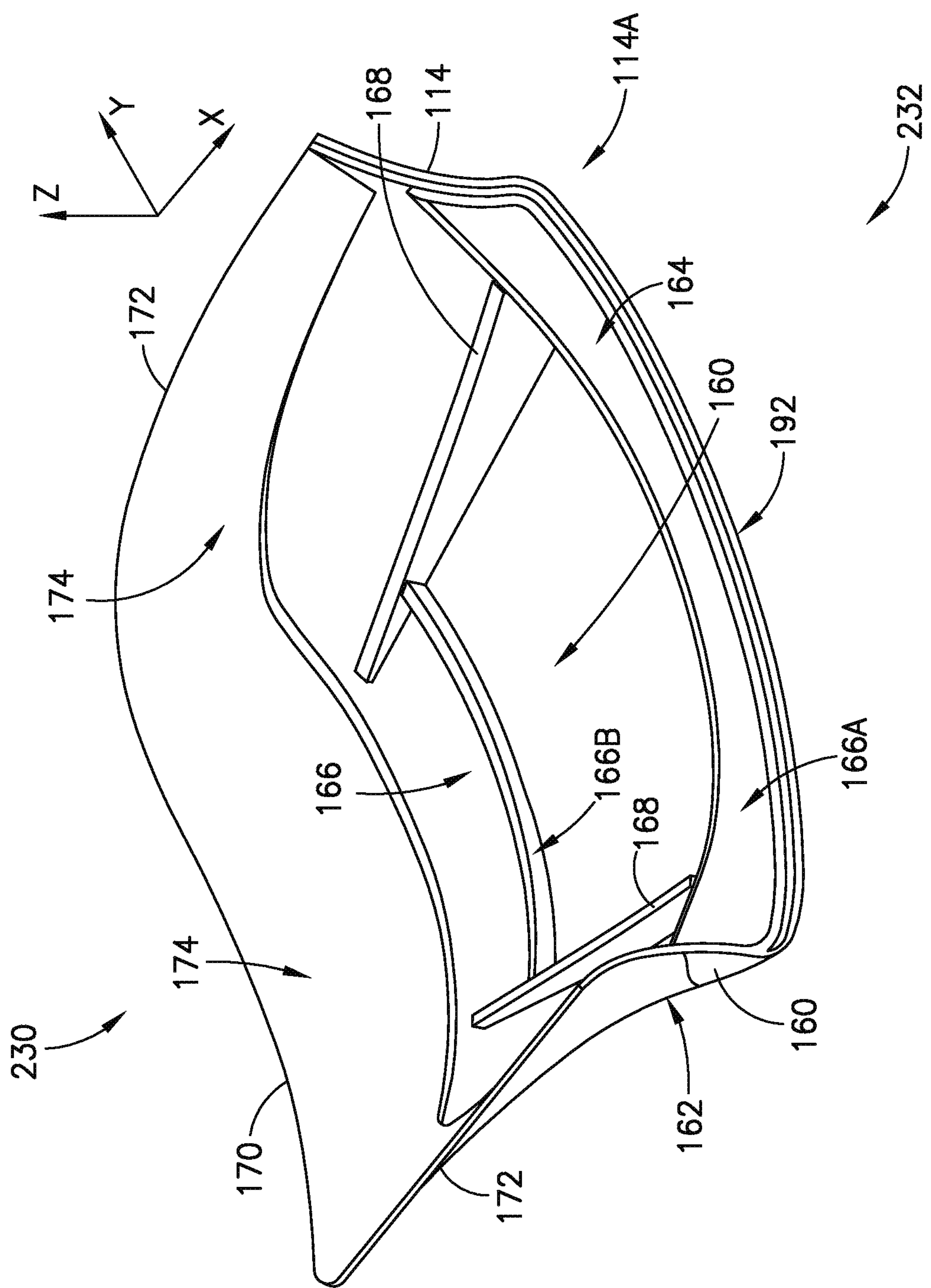
Figure 6:
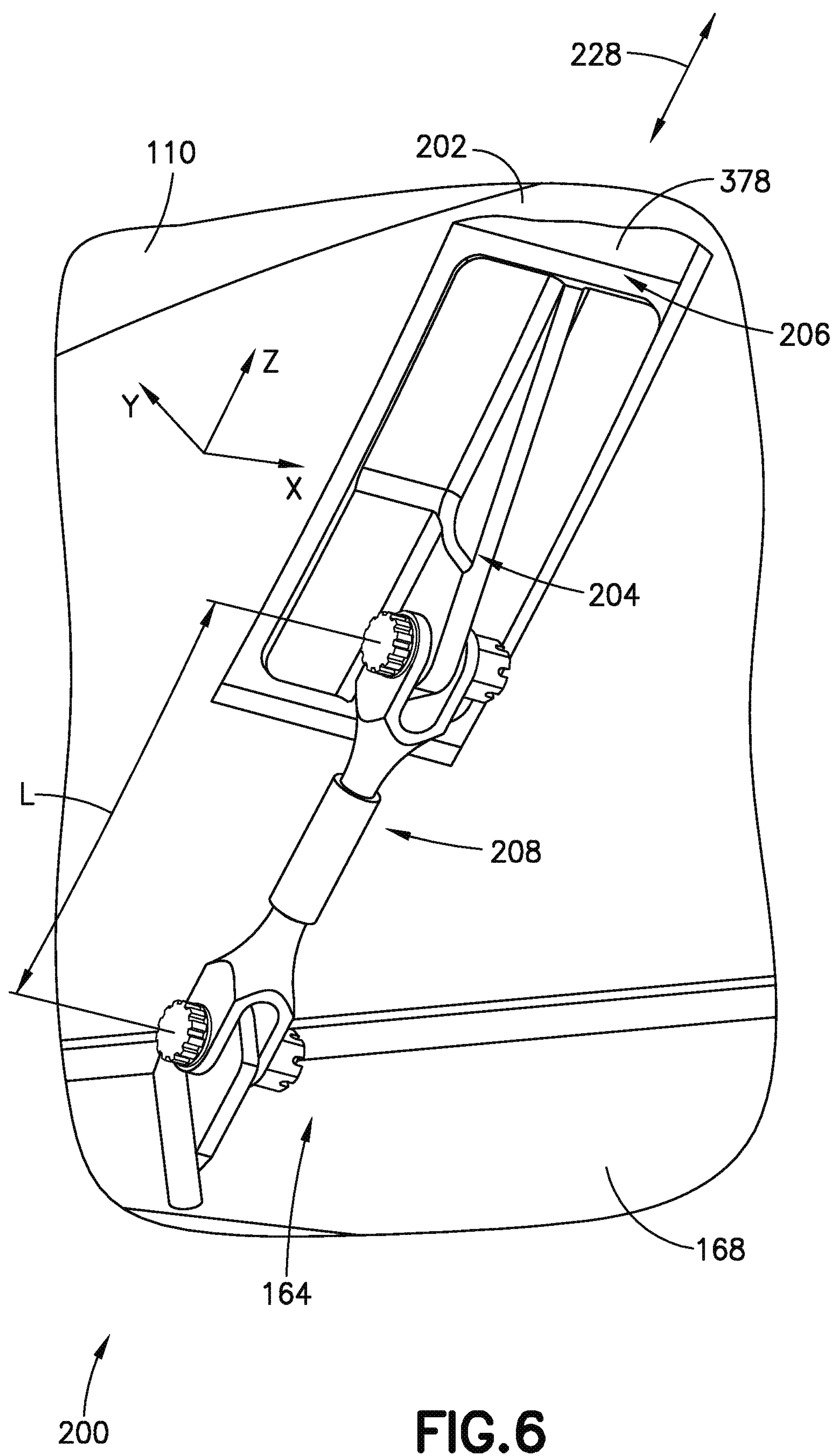
Figure 7:
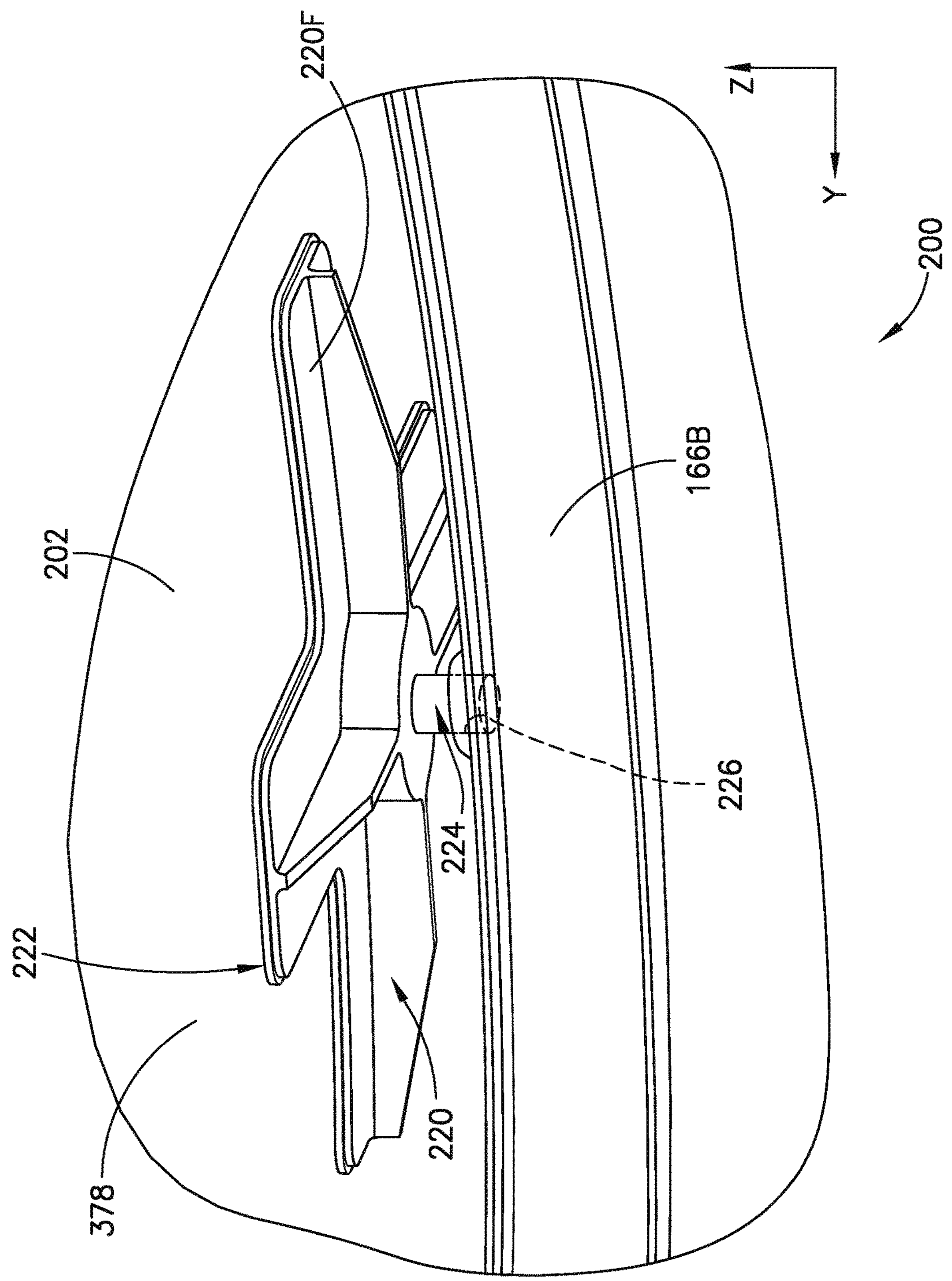
Figure 8A:
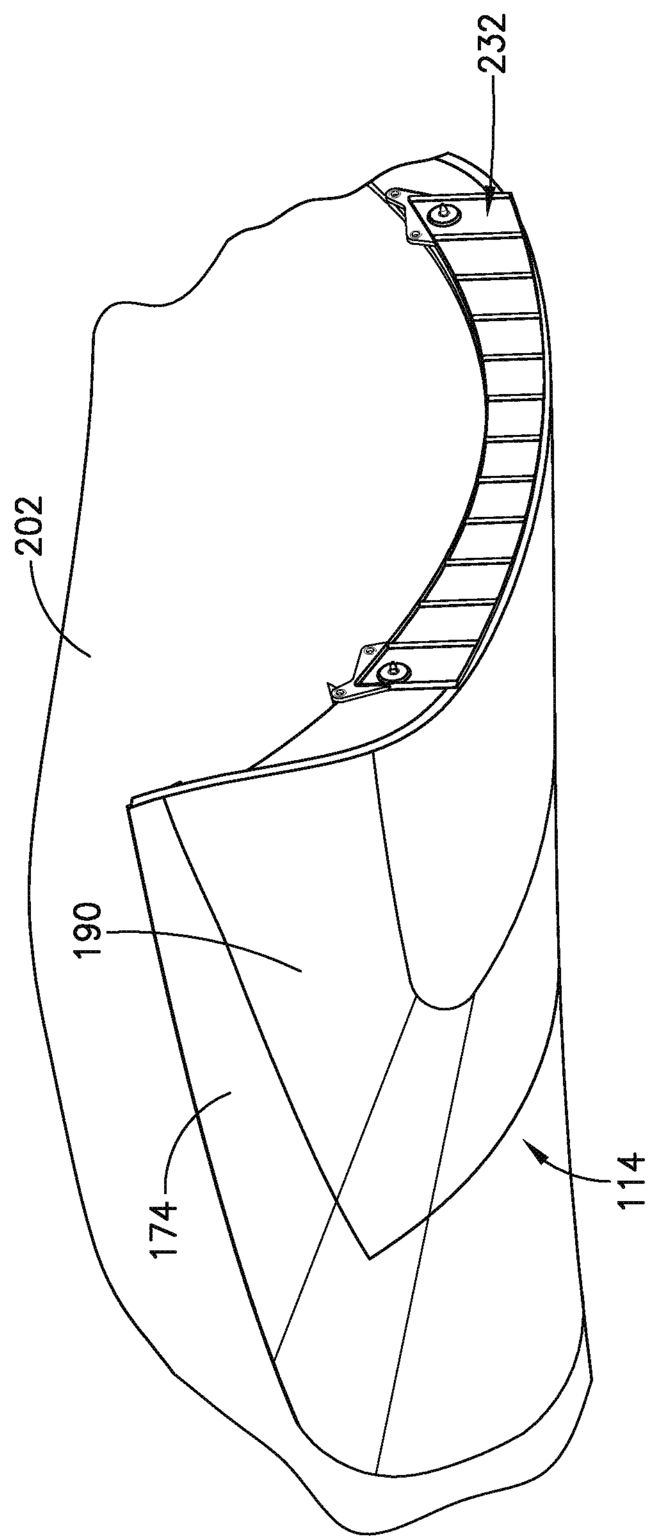
Figure 8B:
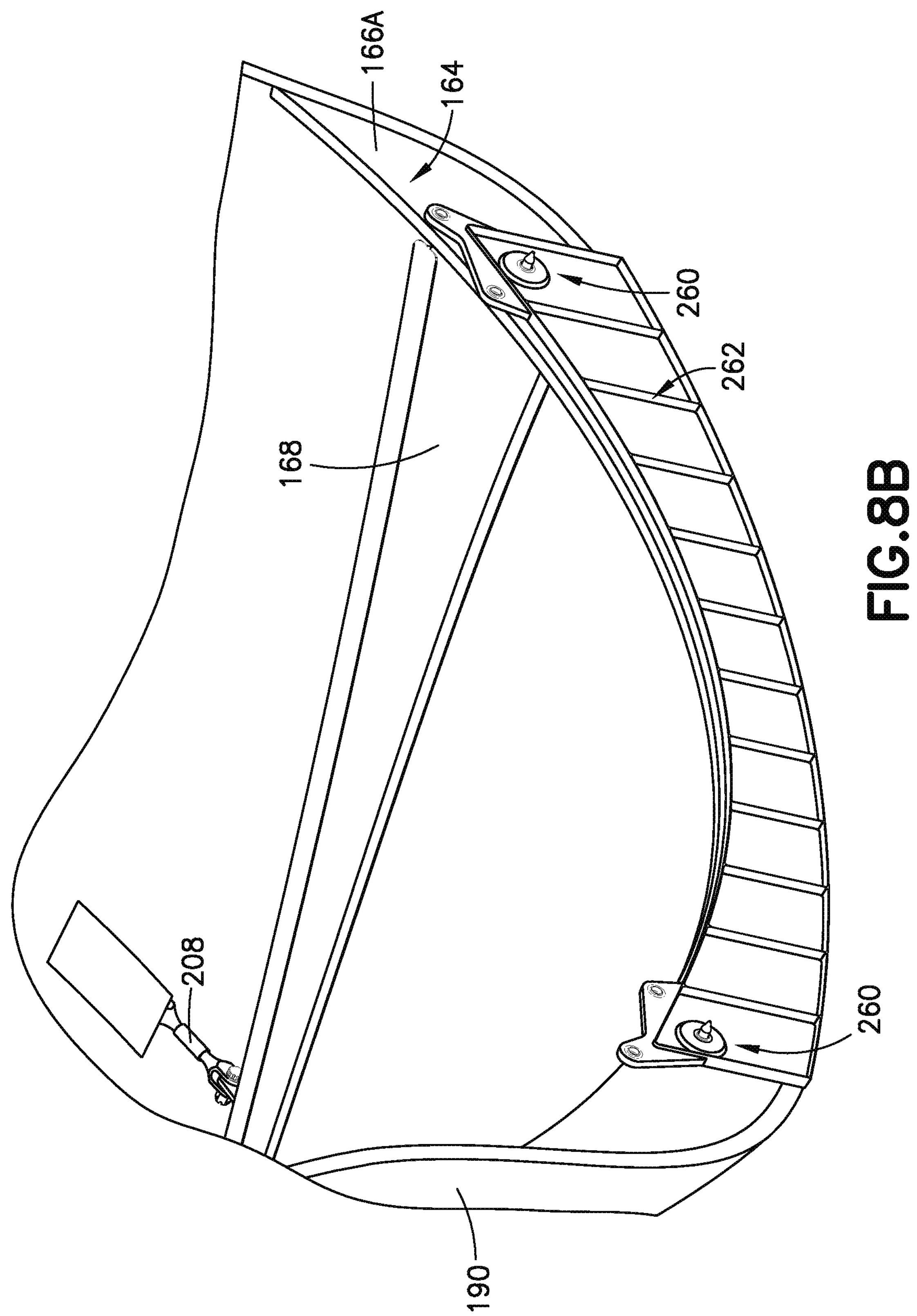
Figure 9:
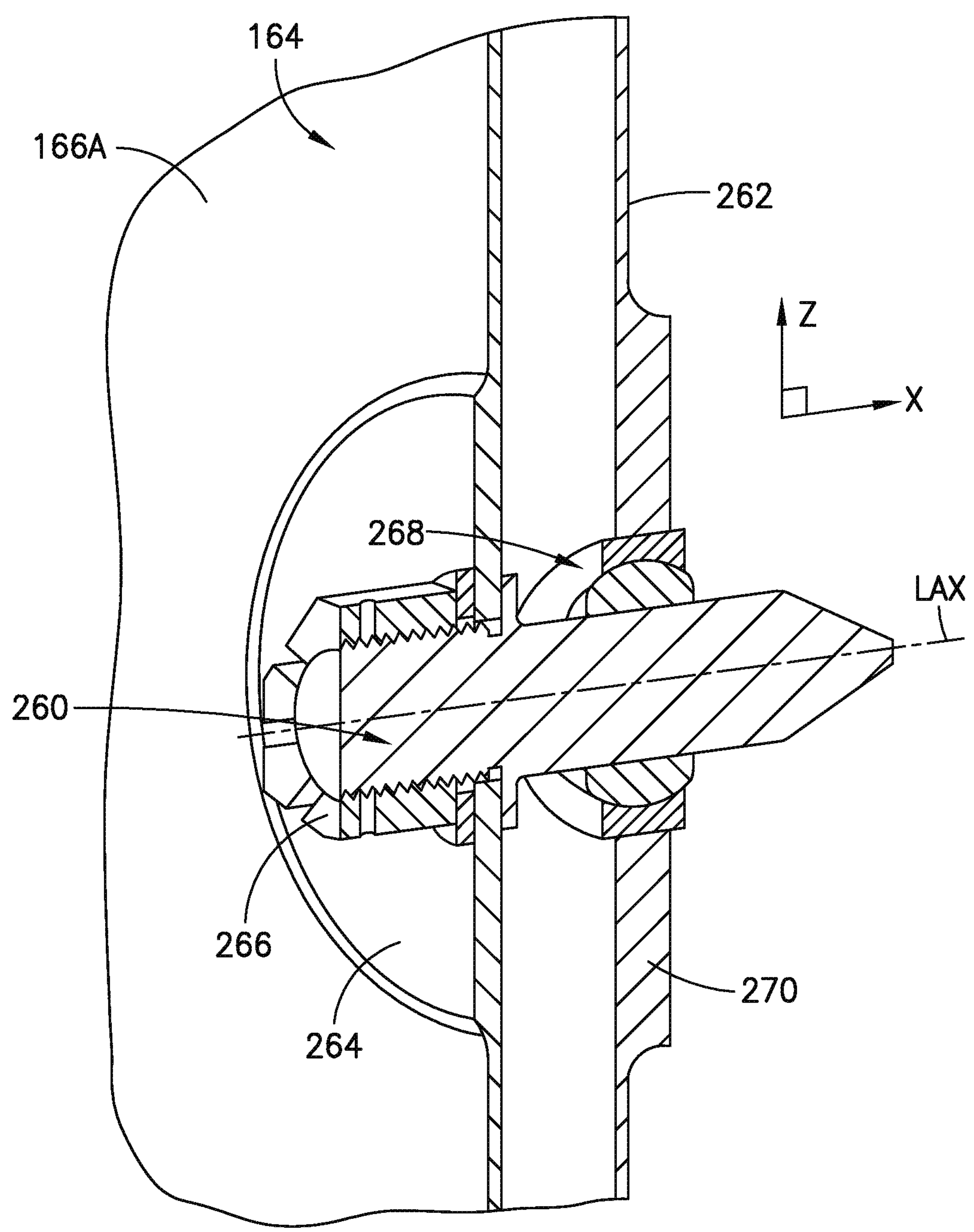
Figure 10:
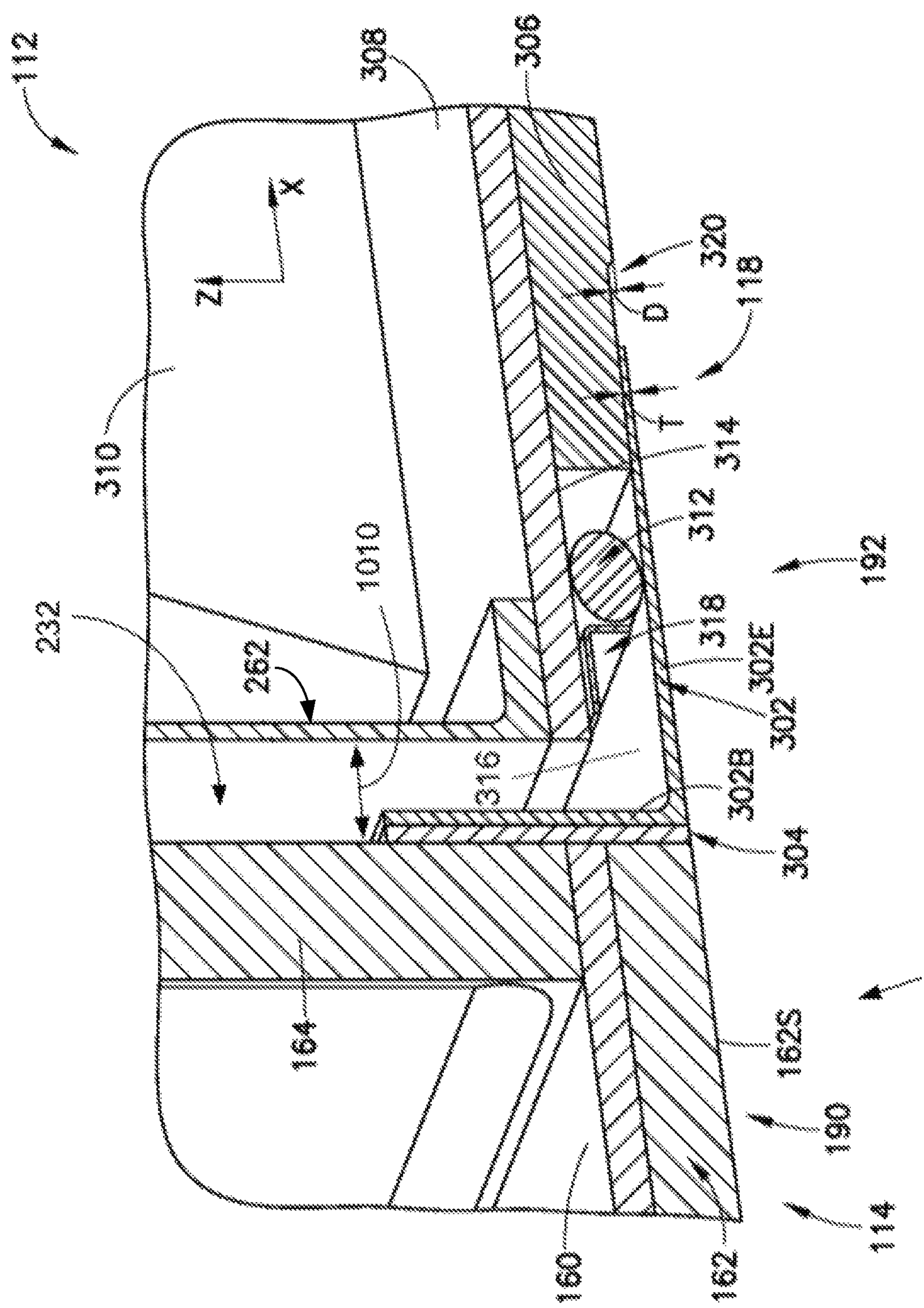
Figure 11:
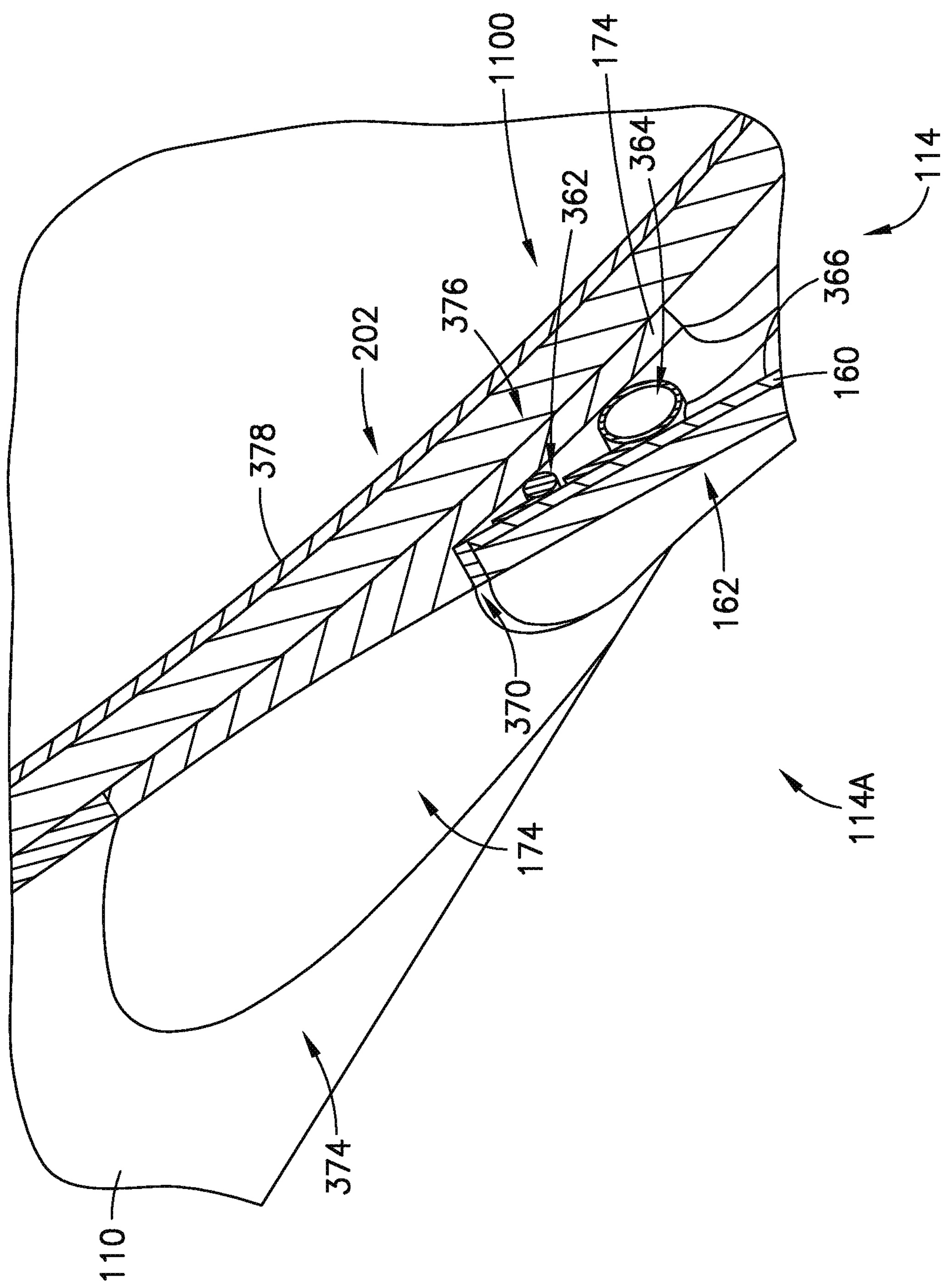
Figure 12A:
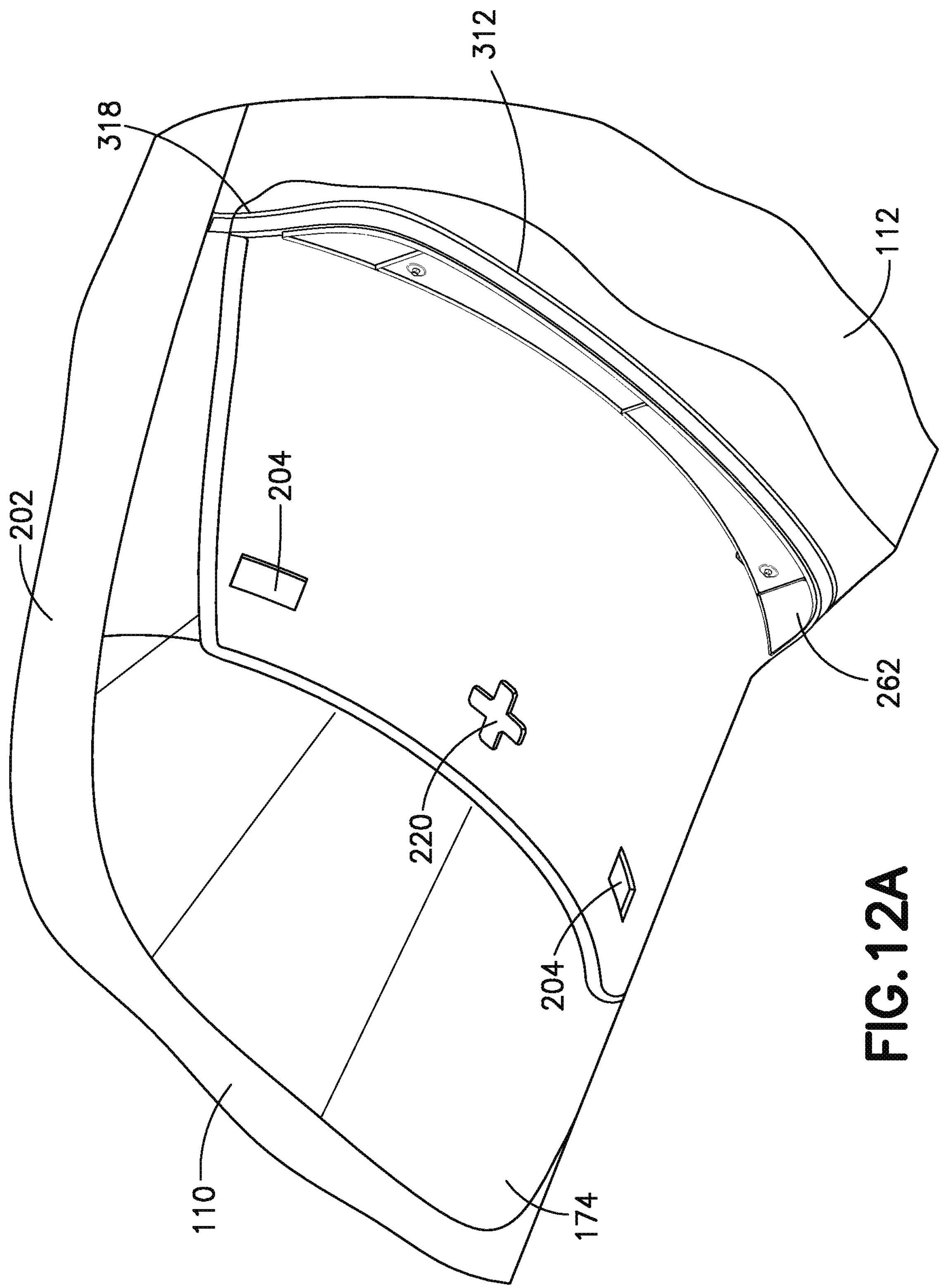
Figure 12B:
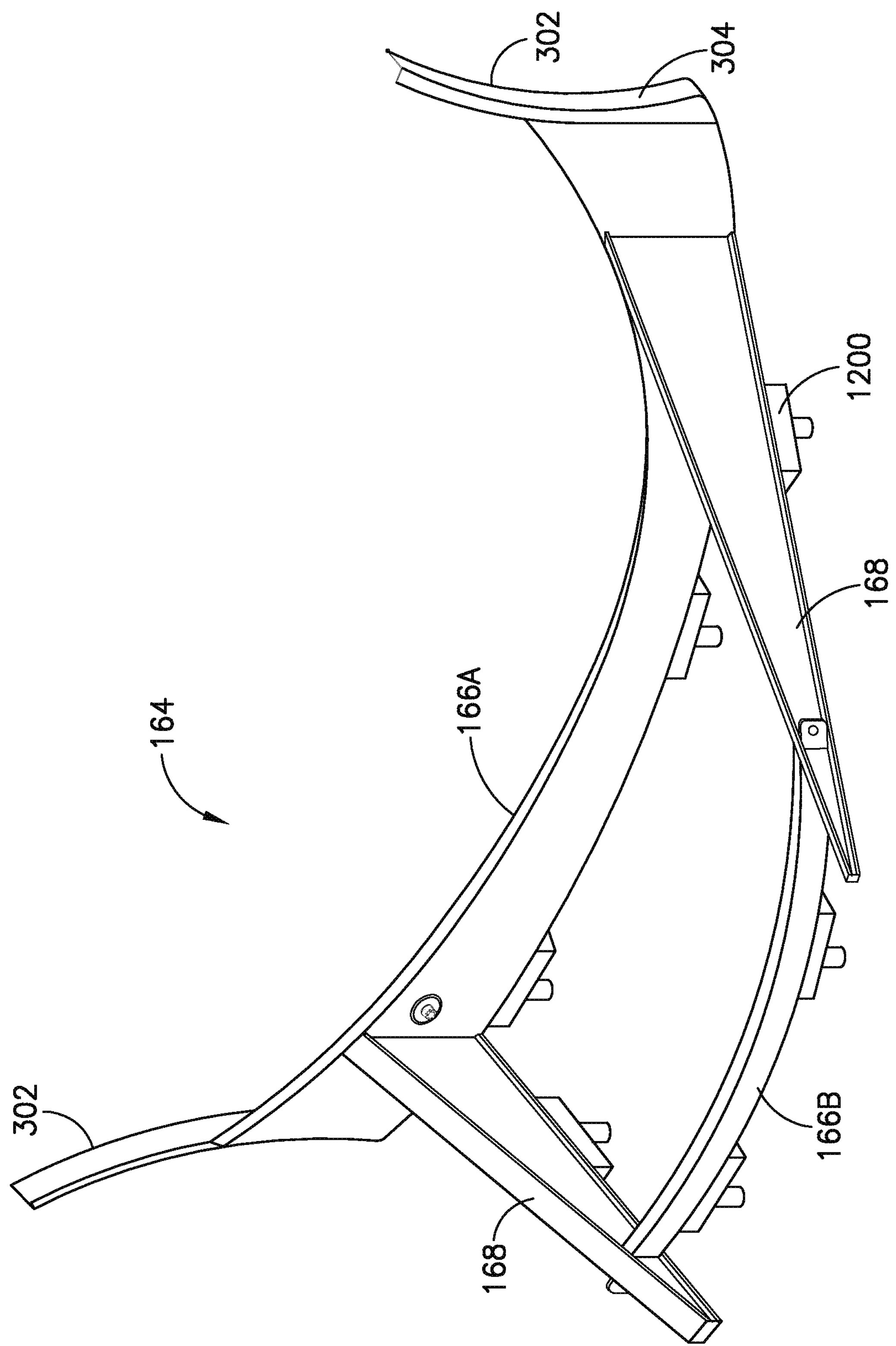
Figure 12C:
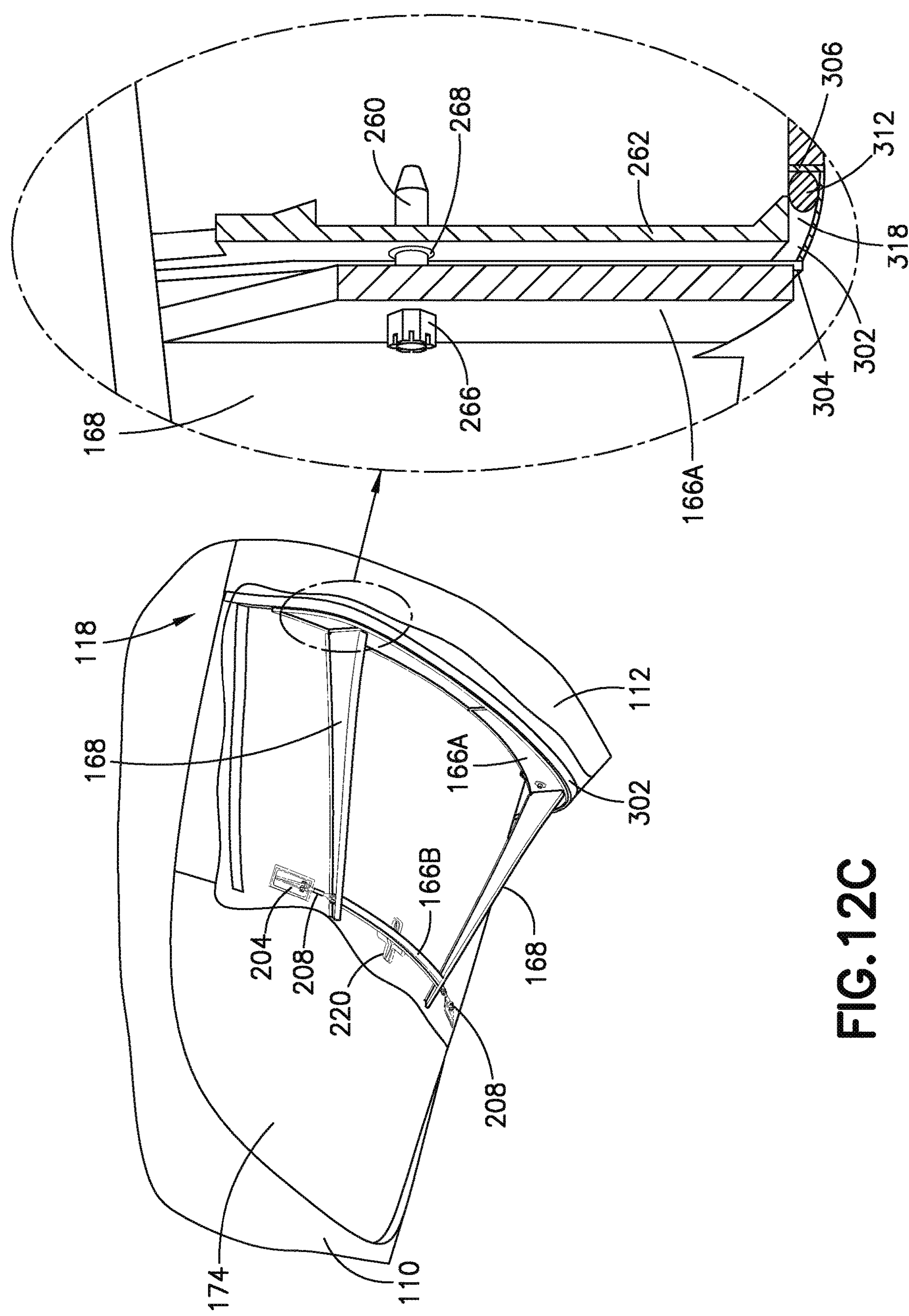
Figure 12D:
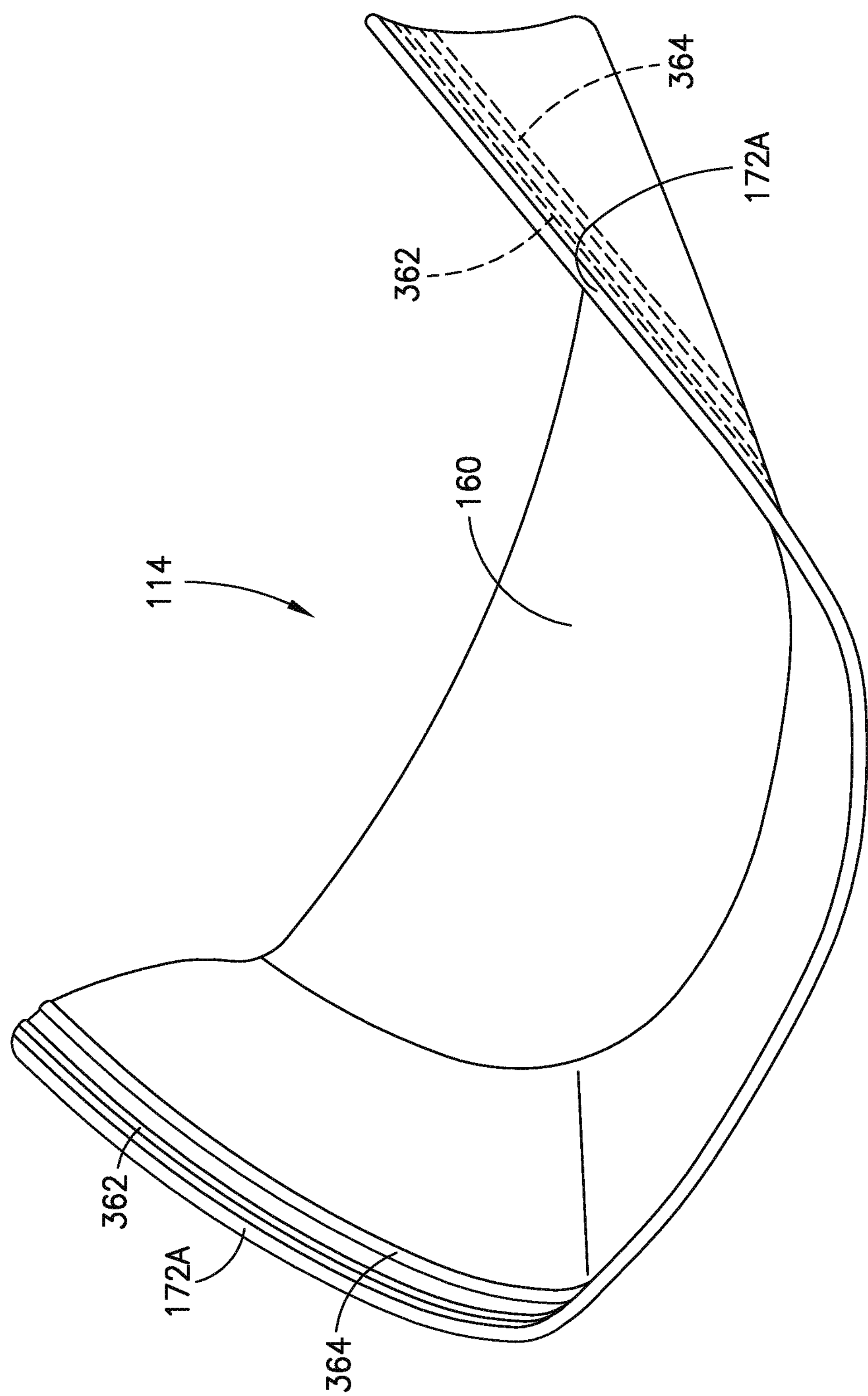
Figure 12F:
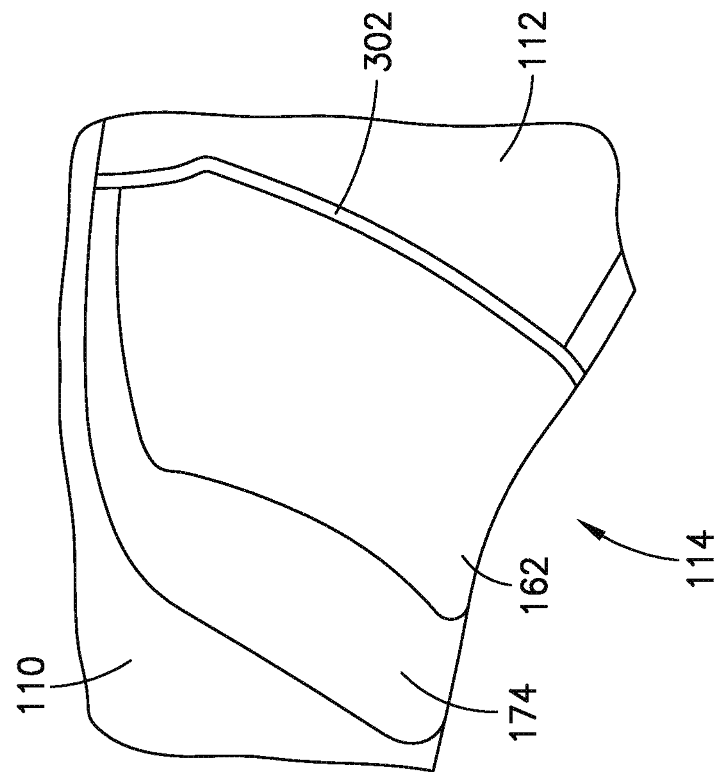
Figure 12E:
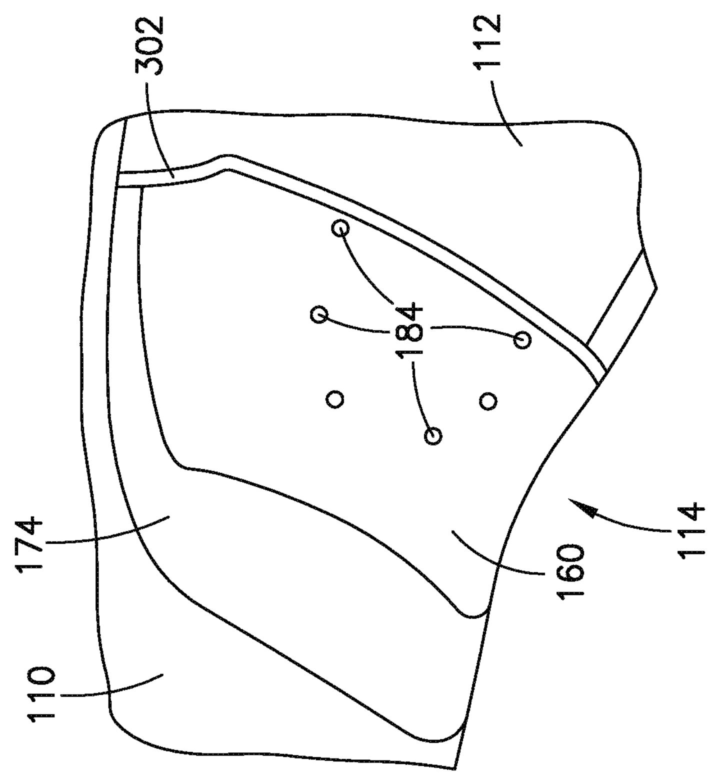
Figure 13:
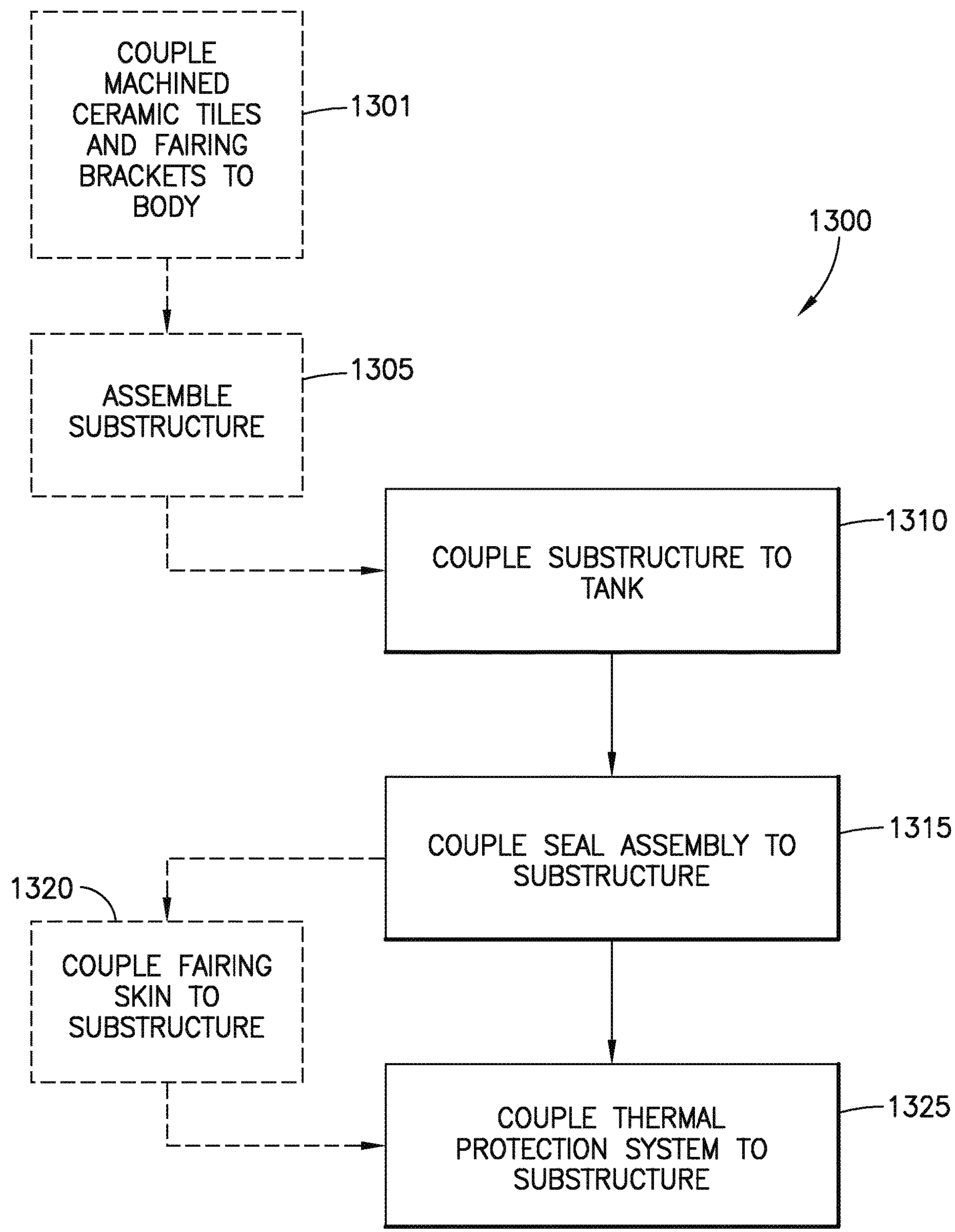

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a top perspective view of an aerial vehicle in accordance with aspects of the present disclosure;

FIG. 2 is a bottom perspective view of the aerial vehicle of FIG. 1;

FIG. 3 is a bottom perspective view of a fairing for use with the aerial vehicle of FIGS. 1 and 2 in accordance with aspects of the present disclosure;

FIG. 4 is a bottom perspective view of the fairing of FIG. 3;

FIG. 5 is a top perspective view of the fairing of FIGS. 3 and 4;

FIG. 6 is a bottom perspective view of a portion of a fairing substructure of the aerial vehicle of FIGS. 1 and 2 in accordance with aspects of the present disclosure;

FIG. 7 is a bottom perspective view of a portion of the fairing substructure of the aerial vehicle of FIGS. 1 and 2 in accordance with aspects of the present disclosure;

FIG. 8A is a bottom perspective view of a portion of the fairing substructure of the aerial vehicle of FIGS. 1 and 2 in accordance with aspects of the present disclosure;

FIG. 8B is a side perspective view of a portion of the fairing substructure of the aerial vehicle of FIGS. 1 and 2 in accordance with aspects of the present disclosure;

FIG. 9 is a cross-sectional perspective view of a portion of the fairing substructure of the aerial vehicle of FIGS. 1 and 2 in accordance with aspects of the present disclosure;

FIG. 10 is a cross-sectional perspective view of a fairing to wing seal substructure of the aerial vehicle of FIGS. 1 and 2 in accordance with aspects of the present disclosure;

FIG. 11 is a cross-sectional perspective view of a fairing to body seal substructure of the aerial vehicle of FIGS. 1 and 2 in accordance with aspects of the present disclosure;

FIGS. 12A-12F are schematic illustrations of a fairing installation method for the fairing of the aerial vehicle of FIGS. 1 and 2 in accordance with aspects of the present disclosure, where FIG. 12A is a bottom perspective view of a portion of the fairing substructure in accordance with aspects of the present disclosure, FIG. 12B is a top perspective view of a portion of the fairing substructure in accordance with aspects of the present disclosure, FIG. 12C is a bottom perspective view of a portion of the fairing substructure in accordance with aspects of the present disclosure, FIG. 12D is a top perspective view of the fairing in accordance with aspects of the present disclosure, FIG. 12E is a bottom perspective view of a portion of the fairing in accordance with aspects of the present disclosure, and FIG. 12F is a bottom perspective view of the fairing in accordance with aspects of the present disclosure; and FIG. 13 is a schematic illustration of a method in accordance with aspects of the present disclosure.

DETAILED DESCRIPTION

Referring to FIGS. 1, 2, and 3, the aspects of the present disclosure are described herein with respect to aerial vehicle 100, which may be a re-useable winged launch vehicle and/or hypersonic vehicle however; the aspects of the present disclosure can be applied to any application (e.g., aerospace, maritime, automotive, industrial, etc.) involving interfaces where relative growth exists. Here, the aerial vehicle 100 generally includes a tank 202 that forms at least a portion of a body 110 of the aerial vehicle 100 and wing 112 coupled to the tank 202. The tank 202 has a tank skin 378 and is a pressurized fluid (e.g., fuel or other pressurized fluid) tank or pressure vessel. The wing 112 has an edge 118 that is at least partially defined by a wing skin 308.

The aerial vehicle 100 further includes a fairing assembly 114A coupled to the tank 202 adjacent the edge 118 of the wing 112. The fairing assembly 114A seals the wing 112 to body 110 interface while providing for relative growth between the body 110 and the wing 112. The fairing assembly 114A can provide for relative motion between the faired structures (e.g., such as a wall of the tank 202 and the wing 112) of about ±0.5 inches (about ±1.3 centimeters); while in other aspects, the relative motion may be more or less than about ±0.5 inches (about ±1.3 centimeters). Fairing assembly 114A can prevent airflow from entering internal cavities of vehicle 100 through the use of, e.g., high-temperature seals. The fairing assembly 114A may provide a consistent flow seal along the perimeter of a fairing 114 of the fairing assembly 114A, maintain a smooth outer mold line of the aerial vehicle 100 to substantially avoid and/or reduce aerodynamic/aerothermal affects, and provide thermal protection for the aerial vehicle 100 up to 1700 degrees Fahrenheit (about 926 degrees Celsius) or more. The aspects of the present disclosure also provide the faring assembly 114A with coupling features for coupling the fairing 114 to a pressure vessel wall (e.g., such as a wall of the tank 202) where the coupling features may facilitate an installation scheme that streamlines at least a portion of the assembly operations of the aerial vehicle 100.

The fairing assembly 114A includes a substructure 164, a thermal protection system 190, and a seal assembly 192. The fairing assembly 114A includes a fairing 114 that couples to the tank 202 adjacent the edge 118 of the wing 112. While the fairing 114 is illustrated in FIGS. 1-3 as being coupled to a lower side 120 of the body 110, in other aspects, the fairing 114 and fairing assembly 114A may be located at any suitable position of the aerial vehicle 100 to fair two structures to each other. As noted above, the fairing assembly 114A can provide for relative growth (e.g., due to thermal and/or pressure effects) between the wing 112 and the tank 202 because the fairing 114 is fixedly coupled to the tank 202 and includes the seal assembly 192, such as a lap seal, that extends over (e.g. overlaps) the edge 118 of the wing 112.

The fairing assembly 114A is positioned at the forward end 112F (e.g., the edge 118 is a forward edge) of the wing 112 because there is generally zero relative growth at the aft end 112R (such as at a rear spar) of the wing 112 due to, for example, the coupling between the wing 112 and the body 110. In accordance with the aspects of the present disclosure, the wing 112 generally grows in a forward direction 122 (e.g., along the X axis/direction illustrated in FIGS. 1-3) where the growth is caused by differing thermal expansion and pressure loads present in the wing 112 and body 110 during various stages of operation. In accordance with the aspects of the present disclosure, the wing 112 grows into a space (e.g. that defines a dynamically variable gap 1010) defined between the fairing assembly 114A and a forward frame 262 (see FIGS. 8B, 9, and 10) of the wing 112. Here, the seal assembly 192 of the fairing assembly 114A maintains a smooth outer mold line of the aerial vehicle 100 by covering the edge 118 of the wing 112. In accordance with the aspects of the present disclosure, as the wing 112 grows and shrinks, e.g., again due to thermal effects, the fairing assembly 114A remains stationary relative to the tank 202.

Referring now to FIGS. 4 and 5, a bottom perspective view and a top perspective view of fairing assembly 114A is shown, noting that FIG. 4 illustrates the fairing 114 as being transparent and FIG. 5 is a perspective view looking inside fairing 114. The fairing assembly 114A includes the substructure 164, the thermal protection system 190, and the seal assembly 192, as noted above. In one aspect, the fairing assembly 114A includes a fairing 114 having a fairing skin 160 that is coupled to the substructure 164 as will be described in greater detail herein. The fairing 114 may be constructed of any suitable material, such as any suitable composite, and includes thermal protection blankets 162 bonded to an outer surface of the fairing skin 160. The thermal protection blankets 162 described herein may be Tailorable Advanced Blanket Insulation (e.g., "TABI" that includes ceramic fiber with Q-FIBER® felt insulation or any other suitable silica fiber based insulation), Conformal Reusable Insulation (e.g., "CRI" that includes a ceramic matrix composite), metallic thermal protection systems, or any other suitable thermal protection material/system. The thermal protection blankets 162 form at least part of a thermal protection system 190 of the fairing assembly 114A. The fairing skin 160 may have any suitable shape and size so that a smooth outer mold line is formed between the faired structures (which in the example provided herein are the tank 202 of the body 110 and the wing 112).

The substructure 164 may be constructed of any suitable material to provide stiffness to the fairing 114 and enable blind fastener installation (as described herein) from the outer mold line of the aerial vehicle 100, which can simplify installation of the fairing 114 by providing for tightening of the fasteners from only one side of the fairing 114 for coupling the fairing 114 to the tank 202 through the substructure 164. The substructure 164 includes of a series of frames 166 (e.g., aft frame 166A and forward frame 166B) and longerons 168 and is configured to couple with a tank skin 378 (see e.g., FIGS. 6 and 11) of tank 202 in any suitable manner, such as described herein, so that loads from the fairing assembly 114A are reacted to the tank skin 378 as hoop-wise reaction loads (i.e., the reaction loads are substantially only tangent to a surface of the tank 202).

The leading edge 170 and side edges 172 of the fairing 114 include machined ceramic tiles 174 that are bonded to the body 110 (the body 110 is not shown in FIG. 5 for clarity). Here, the machined ceramic tiles 174 form a portion of thermal protection system 190 and are coupled (such as by the aforementioned bonding) to the tank skin 378 of tank 202. The machined ceramic tiles 174 provide a gradual loft transition between the body outer mold line 180 and the wing outer mold line 182 (where the body outer mold line 180 and the wing outer mold line 182 form a portion of the aerial vehicle outer mold line), and may substantially prevent the presence of drag-inducing forward facing steps that would result from a fairing of finite thickness interfacing with the body 110. The ceramic tiles 174 also provide thermal protection for the underlying structure (e.g., such as the tank 202 and at least the substructure 164). The ceramic tiles 174 also provide a wear-resistant rub surface for forward and side seals (such as second barrier member 362 and pressure seal 364 of the fairing assembly 114A (see FIGS. 11 and 12D)) to bear against.

The seal assembly 192 of the fairing assembly 114A is coupled to the substructure 164. As will be described herein, the seal assembly 192 is configured to overlap at least a portion of the edge 118 of the wing 112. Here, the seal assembly 192 forms a dynamic seal between thermal protection system 190 (e.g., the fairing 114) and the wing 112 so as to provide for relative movement between the wing 112 and the thermal protection system 190 (e.g., the fairing 114). Further, the seal assembly 192 forms a dynamic seal between the thermal protection system 190 and the wing 112 so as to provide for relative movement between the wing 112 and the tank 202 (see, e.g., FIG. 10).

Referring to FIGS. 4, 6, 7, 8, and 9, the substructure 164 is coupled to the tank skin 378 with a mounting system 200. As described above, the mounting system 200 is configured to couple the substructure 164 to the tank 202 so that the tank 202 reaction loads, resulting from the fairing assembly 114A, are hoop-wise or tangent 228 reaction loads (i.e., the reaction loads are substantially only tangent to a surface of the tank 202). The mounting system 200 includes at least one strut 208 configured to couple the substructure 164 to the tank skin 378. In one aspect, the at least one strut 208 has an adjustable longitudinal length L, while in other aspects the at least one strut has a fixed longitudinal length L. The at least one strut 208 is configured to react only Z-axis loads and Y-axis loads between substructure 164 and the tank skin 378.

As described above, and in accordance with aspects of the present disclosure, the portion of the body 110 that fairing assembly 114A attaches to includes tank 202, and the tank 202 is a pressure vessel (such as a pressurized fuel tank) having the tank skin 378. The mounting system 200 includes attachment brackets 204 (see also FIG. 12A) that are bonded, in any suitable manner, to the tank skin 378, which forms an outer mold line of the tank 202, to prevent the creation of leak paths and/or stress concentration that can be caused by forming holes through the tank skin 378. The attachment brackets 204 provide a coupling between a respective strut 208 and the tank 202 for coupling the substructure 164 to the tank 202.

In one aspect, the mounting system 200 may also include an isolator member 206 corresponding to each of the at least one strut 208, where the at least one strut 208 is bonded to tank skin 378 through the isolator member 206. For example, the isolator member 206 is disposed between the at least one strut 208 and the tank skin 378. In particular, the isolator member 206 is disposed between the attachment bracket 204 and the tank 202 to reduce stresses resulting from thermal and pressure-induced strains in the tank 202. The isolator member 206 is configured so that the tank 202 strains independent of the substructure 164. In other aspects, the isolator member 206 may not be included.

The fairing substructure 164 is coupled, at the forward end 230 (shown in FIG. 5), to the tank 202 with two struts 208 that are interfaced with the respective attachment brackets 204. The struts 208 are pivotally coupled at one end to a respective attachment bracket 204 and pivotally coupled on the other opposite end to a respective longeron 168. The struts 208 may have an adjustable longitudinal length L to provide adjustability to manage tolerances during installation. In addition, the pivotal coupling between the strut 108 and each of the attachment bracket 204 and the longeron 168 may provide the strut 208 with an ability to rotate relative to at least the tank 202 to allow the tank 202 to expand under pressure.

In accordance with aspects of the present disclosure, still referring to referring to FIGS. 4, 6, 7, 8, and 9, the mounting system 200 includes a coupling bracket 220 configured to couple the substructure 164 to the tank skin 378. The coupling bracket 220 is configured to react only X-axis loads and Y-axis loads between substructure 164 and tank skin 378. The coupling bracket 220 is bonded to the tank skin 378 in any suitable manner. In one aspect, the mounting system 200 includes an isolator member 222 disposed between the coupling bracket 220 and the tank skin 378, where the coupling bracket 220 is bonded to tank skin 378 through the isolator member 206. For example, the isolator member 222 is disposed between the coupling bracket 220 and the tank skin 378 of the tank 202 to reduce stresses resulting from thermal and pressure-induced strains in the tank 202. The isolator member 222 is configured so that the tank 202 strains independent of the substructure 164. In other aspects, the isolator member 222 may not be included.

The coupling bracket 220 includes a bracket frame 220F and a coupling member 224 extending from the frame 220F towards the substructure 164 so that the coupling member 224 slidably engages a corresponding aperture 226 in the substructure 164. In one aspect, the coupling member 224 is a pin, but in other aspects, the coupling member 224 may have any suitable configuration. In one aspect, the coupling member 224 interfaces with the substructure 164 forward frame 166B (e.g., the aperture 226 is disposed in the forward frame 166B), but in other aspects the coupling member 224 may interface with any suitable portion of the substructure 164. The coupling member 224 and corresponding aperture 226 are configured so that the coupling member 224 slidably engages the corresponding aperture 226 in a Z-direction so as to only react the X-axis loads and the Y-axis loads between substructure 164 and tank skin 378. In one aspect, the coupling member 224 is threaded into the coupling bracket 220, but in other aspects the coupling member 224 may be coupled to the bracket in any suitable manner. In one aspect, the aperture 226 includes any suitable bushing that interfaces with the coupling member 224. The struts 208 and coupling member 224 (along with their respective brackets 204, 220) constrain the location of at least part of the fairing assembly 114A relative to the body 110.

Referring to FIGS. 4 and 7, the aperture 226 may be formed in, or otherwise defined by, the forward frame 166B, and the struts 208 may be coupled to the respective longeron 168 so as to be substantially in-line with the forward frame 166B (e.g., so that the struts 208 and the aperture 226 exist along a common straight line). In other aspects, the struts 208 and the aperture 226 may have any suitable spatial arrangement relative to each other to react loads in the manner described herein. The aperture 226 may also be disposed between the longerons 168 so that the coupling bracket 220 is bonded to the tank 202 and centered between the two struts 208. In other aspects, the coupling bracket 220 may not be centered between the two struts 208. In one aspect, the struts 208 and coupling bracket 220 are aligned on the tank 202 so that that the tank reaction loads are hoop wise or tangent 228 (FIG. 6) with respect to the tank 202 surface, which may minimize punch loads in the tank skin 378 and may minimize any local stresses that would result.

Referring to FIGS. 8A, 8B, and 9, the substructure 164 includes one or more pins 260 extending from, for example, the aft frame 166A towards the wing 112. The one or more pins 260 are configured to slidably engage a wing forward frame 262 of the wing 112 so that the wing 112 moves relative to the substructure 164 along a longitudinal axis LAX (which in the exemplary coordinate system illustrated in, e.g., FIGS. 1 and 9 is coincident with the X-axis) of the one or more pins 260. In one aspect, the one or more pins 260 are each coupled to a raised face 264 of substructure 164 with any suitable fastener 266. For example, the fastener 266 may be a nut and the one or more pins 260 may include threads for engaging the nut to couple the respective pin 260 to the aft frame 166A. In other aspects, the one or more pins 260 may be coupled to the substructure 164 in any suitable manner.

In accordance with aspects of the present disclosure, the longitudinal axis LAX of the one or more pins 260 is substantially aligned with a longitudinal axis LAXT (FIG. 1) of the tank 202. The one or more pins 260 react only Z-axis and Y-axis loads between the substructure 164 and the wing forward frame 262. At the aft end 232 of substructure 164, the one or more pins 260 form an interface between the substructure 164 and the wing forward frame 262 at the forward end 112F of the wing 112. This arrangement can prohibit or otherwise constrain relative motion between the substructure 164 and the wing forward frame 262 in the Z-Y plane, while providing relative growth of the wing 112 relative to the tank 202 in the X direction. Wing forward frame 262 includes one or more spherical bearings 268. In one aspect, each spherical bearing 268 is coupled to raised face 270 (or other suitable portion) of the wing forward frame 262 in any suitable manner. Each spherical bearing 268 is configured to slidably engage a respective pin 260 of the one or more pins 260. The one or more pins 260 are free to move in along the X axis within spherical bearing 268 for guiding the direction of growth of the wing 112 and aligning the wing 112 with the fairing assembly 114A.

Referring now to FIG. 10, seal assembly 192 between the fairing 114 and the wing 112 is illustrated. The seal assembly 192 is coupled to thermal protection system 190. In accordance with aspects of the present disclosure, the seal assembly 192 may avoid aerodynamic drag penalties and hot gas intrusion by substantially preventing fluid flow through at least a portion of the fairing-to-wing interface covered by the fairing assembly 114A. In addition, the seal assembly 192 may provide a smooth interface between the fairing assembly 114A and the wing 112 so as to avoid steps and gaps on the outer surface that may induce aerodynamic and/or aerothermal penalties. The seal assembly 192 also accommodates the relative growth/movement between the wing 112 and the body 110 (and the fairing assembly 114A which is coupled to the body 110). In accordance with the aspects of the present disclosure, the seal assembly 192 has the ability to translate in the X direction relative to the wing 112 while maintaining contact with the wing 112 to form and maintain a sealing arrangement.

The seal assembly 192 is disposed at the aft end 232 (FIG. 5) of the fairing assembly 114A and includes lap seal 302 that is coupled to the substructure 164 in any suitable manner. For example, the lap seal 302 is coupled to the aft frame 166A. The lap seal 302 includes a base portion 302B and an extension portion 302E, where the base portion 302B is coupled to the substructure 164. The lap seal 302 may be constructed of any suitable material, such as metallic superalloy (e.g., INCONEL® or other suitable nickel-based or nickel-chromium-based superalloy material). As can be seen in FIG. 10, in one aspect, a thermal insulator 304 (e.g., constructed of ceramic or other suitable material) is disposed between the base portion of the lap seal 302 and the aft frame 166A (as well as the fairing skin 160 and thermal protection blankets 162) to thermally isolate the substructure 164, fairing skin 160, and thermal protection blankets 162 from heat absorbed by the lap seal 302. In other aspects, the thermal insulator 304 may not be provided.

The fairing assembly 114A includes the fairing 114 having the fairing skin 160 which is coupled to the substructure 164 and overlaid with the thermal protection blankets 162 of the thermal protection system 190. The lap seal 302 (and thermal insulator 304) is positioned relative to the thermal protection blankets 162 so as to be flush with (e.g., substantially no step between) a protective surface 162S of the thermal protection blankets 162. The lap seal 302 is also positioned so that the extension portion 302E overlaps a portion of edge 118 of wing 112. The lap seal 302 (e.g., the extension portion 302E of the lap seal 302) interfaces with and overlaps thermal protection blankets 306 bonded to the wing skin 308, where thermal protection blankets 306 form a wing thermal protection system (similar to thermal protection system 190) to provide thermal protection for the underlying structure 310 of the wing 112. In one aspect, the thermal protection blankets 306 of the wing 112 include a recess 320 in which the extension portion 302E of the lap seal 302 is disposed. The recess 320 has a depth D substantially equal to a thickness T of the extension portion 302E so any step formed between the extension portion 302E and thermal protection blankets 306 by the recess 320 may be de minimus and not impact aerodynamic and/or aerothermal performance of the aerial vehicle 100.

A first barrier member 312 is disposed between the lap seal 302 (e.g., such as the extension portion 302E of the lap seal 302) and wing skin 308. In one aspect, the first barrier member 312 may be a thermal barrier/flow blocker bulb seal mounted to an outer surface 314 of the wing skin 308 so as to bear against (e.g., contact) an inner surface 316 of the lap seal 302. In other aspects, the first barrier member 312 may be any suitable seal configured to provide a thermal sealing arrangement as well as block fluid flow from passing between the wing skin 308 and the lap seal 302. As an example, in one aspect the first barrier member 312 includes an INCONEL® spring tube that is stuffed or filled with alumina batting and wrapped in a NEXTEL® or other suitable ceramic oxide fabric sleeve; however, in other aspects the first barrier member 312 may have any suitable configuration.

The seal assembly 192 also includes a retaining member 318 that is coupled to the wing skin 308 in any suitable manner. The retaining member 318 is configured to maintain a position of the first barrier member 312, during operation, relative to at least the lap seal 302. The retaining member 318 may also be configured to adjust a position of the first barrier member 312 during installation of the first barrier member 312 so that the first barrier member 312 is maintained in a predetermined position relative to the lap seal 302. In one example, at least a portion of the first barrier member 312 extends between the retaining member 318 and the wing skin 308 so the retaining member 318 positions the first barrier member 312 relative to at least the lap seal 302. In other aspects, the first barrier member 312 may be retained by the retaining member 318 in any suitable manner, such as chemical bonding. As an example, as the wing 112 translates (e.g., expands and retracts) relative to the body 110, the lap seal 302 maintains an overlap of the wing-mounted thermal protection blankets 306, for example the recess 320 of blanket 306, while the first barrier member 312 is compressed between the lap seal 302 and the wing skin 308 so as to maintain contact with both the lap seal 302 and the wing skin 305. This configuration can provide a dynamic sealing solution that maintains a smooth outer mold line (OML) while withstanding temperatures of up to about 1700 degrees Fahrenheit (about 926 degrees Celsius) or greater (e.g., the upper limit of thermal protection may be limited only by the thermal properties of the materials used in the fairing assembly 114A).

Referring now to FIG. 11, another sealing arrangement 1100 of the fairing assembly 114A is illustrated, where the sealing arrangement 1100 may be considered part of the seal assembly 192 of the fairing assembly 114A. This sealing arrangement 1100 is disposed at the forward end 230 (shown in FIG. 5) of the fairing assembly 114A and seals the fairing 114 to the body 110 so as to provide the smooth outer mold line as described herein. In accordance with aspects of the present disclosure, the sealing arrangement 1100 between the fairing 114 and the body 110 includes a second barrier member 362. The second barrier member 362 includes an INCONEL® spring tube that is stuffed or filled with alumina batting and wrapped in a NEXTEL® or other suitable ceramic oxide fabric sleeve; however, in other aspects the second barrier member 362 may have any suitable configuration. The second barrier member 362 is coupled to an inner surface 366 of the fairing 114 in any suitable manner, such as chemical bonding and/or with mechanical fasteners.

The sealing arrangement 1100 also includes a pressure seal 364, such as a silicone pressure bulb seal or other suitable bulb seal, that is coupled to the inner surface 366 of the fairing 114 in any suitable manner, such as chemical bonding and/or mechanical fasteners. The pressure seal 364 is configured to provide a pressure-tight seal at the interface between the fairing 114 and the machined ceramic tiles 174. The second barrier member 362 and pressure seal 364 are, as noted above, mounted to the fairing inner surface 366 so as to bear against (e.g., contact) the machined ceramic tile 174. Any suitable thermally protective gap filler 370 may be disposed between the machined ceramic tiles 174 and each of the fairing skin 160 and the thermal protection blankets 162 coupled to the fairing skin 160.

The fairing thermal protection blankets 162, gap filler 370, machined ceramic tiles 174, and thermal protection system blankets 374 coupled to the body 110 form the outer surface (outer mold line) of the aerial vehicle 100 and cooperate with the second barrier member 362 and pressure seal 364 to protect the body insulation 376, body skin 379, and/or tank skin 378. Any relative growth between the fairing 114 and the body 110 and/or tank 202 (which forms a portion of the body 110) is managed or allowed by the gap filler 370, the second barrier member 362, and the pressure seal 364, where a sealing arrangement is maintained between the fairing 114 and the machined ceramic tiles 174 during the relative movement between the fairing 114 and the body 110 and/or tank 202. One or more of the second barrier member 362 and the pressure seal 364 may extend along side edges 172A (shown in FIG. 12D) of the fairing 114 so as to engage the machined ceramic tiles 174 at the side edges 172 of the fairing assembly 114A in the manner described above. The sealing arrangement 1100 and the seal assembly 192 illustrated in FIGS. 10 and 11 may maintain an aerodynamically smooth outer mold line capable of withstanding high temperatures (such as those described herein) while providing a pressure seal at the fairing assembly forward end 230, aft end 232 and side edges 172 (shown in FIG. 5).

Referring now to FIGS. 12A-12F, an exemplary method 1300 for coupling the fairing assembly 114A to the aerial vehicle 100 will be described in accordance with aspects of the present disclosure. The method 1300 describes an attachment scheme for coupling the fairing assembly to the tank 202. The method 1300 includes coupling the substructure 164 to the tank 202 (FIG. 13, Block 1310), coupling the thermal protection system 190 to the substructure 164 (FIG. 13, Block 1325), and coupling the seal assembly 192 to the substructure 164 (FIG. 13, Block 1315), as will be described in more detail below. In FIG. 12A the ceramic tiles 174 and the fairing brackets (e.g., attachment brackets 204 and coupling bracket 220) are coupled to the body 110 in any suitable manner (FIG. 13, Block 1301). For example, the machined ceramic tiles 174, the attachment brackets 204, and the coupling bracket 220 may be chemically bonded to tank 202. In block or step 1301, the first barrier member 312 and retaining member 318 may be coupled to the wing 112 as described herein.

In FIG. 12B, the longerons 168, series of frames 166 (e.g. aft frame 166A and forward frame 166B), thermal insulator 304 (see also FIG. 10), lap seal 302 (see also FIG. 10), and the one or more pins 260 (see also FIGS. 8B, 9) are coupled together in any suitable manner to assemble the substructure 164 (FIG. 13, Block 1305). In FIG. 12C, the fairing substructure 164 is coupled to the body 110 (e.g., the tank 202) (FIG. 13, Block 1310). For example, in block or step 1310 (shown in FIG. 13), the coupling bracket 220 is coupled to the tank skin 378 by bonding the coupling bracket 220 to the tank skin 378 so that the coupling member 224 of the coupling bracket slidably engages the substructure 164. In particular, the coupling member 224 of the coupling bracket 220 is engaged with and/or inserted into the aperture 266 of the substructure 164. In block or step 1310 (shown in FIG. 13) at least one strut 208 is coupled to the substructure 164 and the tank 202 where the at least one strut 208 is bonded to a tank skin 378 of the tank 202. In particular, the struts 208 are coupled to both the substructure 164 and the respective attachment brackets 204. In block or step 1310 (shown in FIG. 13) the strut 208 longitudinal length L may be adjusted as needed for coupling the struts 208 to the substructure 164 and the respective attachment bracket 204. The substructure 164 can also be coupled to wing 112. For example, the substructure 164 can be coupled to the wing forward frame 262 of the wing 112 with at least one pin 260 (see FIG. 9) that slidably engages the wing forward frame 262. In particular, the one or more pins 260 (shown in FIG. 9) are engaged with and/or inserted into the spherical bearings 268 (shown in FIG. 9). At Block 1315 (shown in FIG. 13), the seal assembly 192 is coupled to the substructure 164 so that the seal assembly 192 overlaps at least a portion of the edge 118 of the wing 112. More specifically, the substructure 164 is moved in the aft direction (e.g., towards the wing 112) so as to compress the first barrier member 312 and the thermal protection blankets 306 between the wing skin 308 (FIG. 10) and the lap seal 302 so that the seal assembly is coupled to the substructure.

At Block 1320 (shown in FIG. 13, Block 1320), the method 1300 further includes coupling the fairing skin 160 to the substructure 164. More specifically, in FIG. 12D, second barrier member 362 and pressure seals 364 are coupled to the fairing skin 160, and in FIG. 12E the fairing skin 160 is coupled to the fairing substructure 164 using blind-installed fasteners 184. The blind-installed fasteners 184 may include nut plates 1200 (shown in FIG. 12B) coupled to one or more of the forward frame 166B, the aft frame 166A, and the longerons 168. The blind-installed fasteners 184 may provide for the installation of the fasteners with access to only one side (e.g., an exterior side) of the fairing skin 160. The second barrier member 362 and pressure seals 364 are compressed upon fairing skin 160 installation.

The method 1300 further includes coupling the thermal protection system 190 to the substructure 164 (FIG. 13, Block 1325). In FIG. 12F, the thermal protection system 190 is coupled (e.g., by bonding) to the substructure 164 (e.g. such as the outer surface of fairing skin 160) (FIG. 13, Block 1325). In a particular aspect, the thermal protection blankets 162 of the thermal protection system 190 are coupled to the substructure 164.

As described above, the aspects of the present disclosure provide for a fairing assembly 114A that overcomes deficiencies of conventional fairings with respect to accommodating relative movement between faired structures. For example, the aspects of the present disclosure provide for relative movement while maintaining a consistent fluid flow seal along a perimeter of the fairing assembly 114A, a smooth outer mold line fluid flow surface of the aerial vehicle 100, and a thermal protection of up to about 1700 degrees Fahrenheit (about 926 degrees Celsius) or greater (again noting that the thermal protection upper range is only limited by the materials used). In addition, the aspects of the present disclosure provide for a fairing assembly 114A attachment scheme, as described above with respect to FIGS. 12A-12F and 13, that couples the fairing assembly 114A to a thin-walled pressure vessel (e.g., such as tank 202) that may preclude punch loads and leak sources. In the aspects of the present disclosure, the attachment scheme, as described herein, includes bonded attachment brackets (e.g., such as attachment brackets 204 and coupling bracket 220), struts 208, coupling member 224, and one or more pins 260 that provide for, or otherwise allow, relative growth between, e.g., the wing 112 and tank 202 (e.g. which forms part of the body 110) of the aerial vehicle 100 and attachment to the tank skin 378 (e.g., the tank wall). A seal assembly 192 is also provided that includes a lap seal 302 and first barrier member 312 that are used at the fairing-to-wing interface, and machined ceramic tiles 174 that provide a smooth mold line transition and serve as seal bearing surfaces.

The following are provided in accordance with the aspects of the present disclosure:

A1. A fairing assembly for an aerial vehicle having a tank that forms a body of the vehicle and a wing coupled to the tank, the fairing assembly comprising:

a substructure configured to couple with a tank skin of the tank;

a thermal protection system coupled to the substructure; and a seal assembly coupled to the substructure, the seal assembly being configured to overlap at least a portion of an edge of the wing.

A2. The fairing assembly of paragraph A1, wherein the seal assembly forms a dynamic seal between the thermal protection system and the wing so as to provide for relative movement between the wing and the thermal protection system.

A3. The fairing assembly of paragraph A1, wherein the seal assembly forms a dynamic seal between the thermal protection system and the wing so as to provide for relative movement between the wing and the tank.

A4. The fairing assembly of paragraph A1, wherein the thermal protection system is coupled to the tank skin.

A5. The fairing assembly of paragraph A1, wherein the seal assembly is coupled to the thermal protection system.

A6. The fairing assembly of paragraph A1, wherein the seal assembly includes a lap seal.

A7. The fairing assembly of paragraph A6, wherein the lap seal overlaps the portion of the edge of the wing.

A8. The fairing assembly of paragraph A7, wherein the seal assembly includes a barrier member disposed between the lap seal and a skin of the wing.

A9. The fairing assembly of paragraph A8, wherein the lap seal includes a retaining member configured to maintain a position of the barrier member relative to the lap seal.

A10. The fairing assembly of paragraph A8, wherein the barrier member comprises one or more of a thermal barrier and a fluid flow blocking barrier.

A11. The fairing assembly of paragraph A6, wherein the lap seal includes a base portion coupled to the substructure and an extension portion that overlaps the portion of the edge of the wing.

A12. The fairing assembly of paragraph A11, wherein the seal assembly further comprises an isolator member disposed between the base portion of the lap seal and the substructure.

A13. The fairing assembly of paragraph A12, wherein the isolator member is disposed between the base portion of the lap seal and the thermal protection system.

A14. The fairing assembly of paragraph A13, wherein the isolator member is a thermal insulator.

A15. The fairing assembly of paragraph A6, wherein the lap seal interfaces with a wing thermal protection system of the wing.

A16. The fairing assembly of paragraph A1, wherein the edge of the wing is a leading forward edge of the wing.

A17. The fairing assembly of paragraph A1, further comprising a mounting system configured to couple the substructure to the tank so that tank reaction loads, resulting from the fairing assembly, are hoop-wise reaction loads (i.e. are only tangent to a surface of the tank).

A18. The fairing assembly of paragraph A17, wherein the mounting system comprises at least one strut configured to couple the substructure to the tank skin, wherein the at least one strut is configured to react only Z-axis loads and Y-axis loads between substructure and tank skin.

A19. The fairing assembly of paragraph A18, wherein the at least one strut is bonded to the tank skin.

A20. The fairing assembly of paragraph A18, wherein an isolator member is disposed between the at least one strut and the tank skin, the isolator member being configured so that the tank strains independent of the substructure.

A21. The fairing assembly of paragraph A18, wherein the at least one strut has an adjustable longitudinal length.

A22. The fairing assembly of paragraph A17, wherein the mounting system further comprises a coupling bracket configured to couple the substructure to the tank skin, wherein the coupling bracket is configured to react only X-axis loads and Y-axis loads between substructure and tank skin.

A23. The fairing assembly of paragraph A22, wherein the coupling bracket is bonded to the tank skin.

A24. The fairing assembly of paragraph A22, wherein an isolator member is disposed between the coupling bracket and the tank skin, the isolator member being configured so that the tank strains independent of the substructure.

A25. The fairing assembly of paragraph A22, wherein the coupling bracket includes a bracket frame and a pin extending from the frame towards the substructure so that the pin slidably engages a corresponding aperture in the substructure.

A26. The fairing assembly of paragraph A22, wherein the pin and corresponding aperture are configured so that the pin slidably engages the corresponding aperture in a Z-direction so as to only react only the X-axis loads and the Y-axis loads between substructure and tank skin.

A27. The fairing assembly of paragraph of paragraph A1, wherein the substructure includes one or more pins, the one or more pins being configured to slidably engage a wing forward frame of the wing so that the wing moves relative to the substructure along a longitudinal axis of the one or more pins.

A28. The fairing assembly of paragraph A27, wherein the longitudinal axis of the one or more pins is substantially aligned with a longitudinal axis of the tank.

A29. The fairing assembly of paragraph A27, wherein the one or more pins react only Z-axis and Y-axis loads between the substructure and the wing forward frame.

A30. The fairing assembly of paragraph A1, further comprising a fairing having a fairing skin coupled to the substructure, wherein the thermal protection system is coupled to the fairing skin.

B1. An aerial vehicle comprising:

a tank forming at least a portion of a body of the vehicle, the tank having a tank skin;

a wing coupled to the tank, the wing having an edge at least partially defined by a wing skin; and a fairing assembly coupled to the tank adjacent the edge of the wing, the fairing assembly comprising a substructure configured to couple with the tank skin;

a thermal protection system coupled to the substructure; and a seal assembly coupled to the substructure, the seal assembly being configured to overlap at least a portion of the edge of the wing.

B2. The aerial vehicle of paragraph B1, wherein the seal assembly forms a dynamic seal between the thermal protection system and the wing so as to provide for relative movement between the wing and the thermal protection system.

B3. The aerial vehicle of paragraph B1, wherein the seal assembly forms a dynamic seal between the thermal protection system and the wing so as to provide for relative movement between the wing and the tank.

B4. The aerial vehicle of paragraph B1, wherein the thermal protection system is coupled to the tank skin.

B5. The aerial vehicle of paragraph B1, wherein the seal assembly is coupled to the thermal protection system.

B6. The aerial vehicle of paragraph B1, wherein the seal assembly includes a lap seal.

B7. The aerial vehicle of paragraph B6, wherein the lap seal overlaps the edge of the wing.

B8. The aerial vehicle of paragraph B7, wherein the seal assembly includes a barrier member disposed between the lap seal and the wing skin.

B9. The aerial vehicle of paragraph B8, wherein the lap seal includes a retaining member configured to maintain a position of the barrier member relative to the lap seal.

B10. The aerial vehicle of paragraph B8, wherein the barrier member comprises one or more of a thermal barrier and a fluid flow blocking barrier.

B11. The aerial vehicle of paragraph B6, wherein the lap seal includes a base portion coupled to the substructure and an extension portion that overlaps the edge of the wing.

B12. The aerial vehicle of paragraph B11, wherein the seal assembly further comprises an isolator member disposed between the base portion of the lap seal and the substructure.

B13. The aerial vehicle of paragraph B12, wherein the isolator member is disposed between the base portion of the lap seal and the thermal protection system.

B14. The aerial vehicle of paragraph B13, wherein the isolator member is a thermal insulator.

B15. The aerial vehicle of paragraph B6, wherein the lap seal interfaces with a wing thermal protection system of the wing.

B16. The aerial vehicle of paragraph B1, wherein the edge of the wing is a leading forward edge of the wing.

B17. The aerial vehicle of paragraph B1, further comprising a mounting system configured to couple the substructure to the tank so that tank reaction loads, resulting from the fairing assembly, are hoop-wise reaction loads (i.e. are only tangent to a surface of the tank).

B18. The aerial vehicle of paragraph B17, wherein the mounting system comprises at least one strut configured to couple the substructure to the tank skin, wherein the at least one strut is configured to react only Z-axis loads and Y-axis loads between substructure and tank skin.

B19. The aerial vehicle of paragraph B18, wherein the at least one strut is bonded to the tank skin.

B20. The aerial vehicle of paragraph B18, wherein an isolator member is disposed between the at least one strut and the tank skin, the isolator member being configured so that the tank strains independent of the substructure.

B21. The aerial vehicle of paragraph B18, wherein the at least one strut has an adjustable longitudinal length.

B22. The aerial vehicle of paragraph B17, wherein the mounting system further comprises a coupling bracket configured to couple the substructure to the tank skin, wherein the coupling bracket is configured to react only X-axis loads and Y-axis loads between substructure and tank skin.

B23. The aerial vehicle of paragraph B22, wherein the coupling bracket is bonded to the tank skin.

B24. The aerial vehicle of paragraph B22, wherein an isolator member is disposed between the coupling bracket and the tank skin, the isolator member being configured so that the tank strains independent of the substructure.

B25. The aerial vehicle of paragraph B22, wherein the coupling bracket includes a bracket frame and a pin extending from the frame towards the substructure so that the pin slidably engages a corresponding aperture in the substructure.

B26. The aerial vehicle of paragraph B22, wherein the pin and the corresponding aperture are configured so that the pin slidably engages the corresponding aperture in a Z-direction so as to only react the X-axis loads and the Y-axis loads between substructure and tank skin.

B27. The aerial vehicle of paragraph B1, wherein:

the edge of the wing is further defined by a wing forward frame; and the substructure includes one or more pins, the one or more pins being configured to slidably engage the wing forward frame so that the wing moves relative to the substructure along a longitudinal axis of the one or more pins.

B28. The aerial vehicle of paragraph B27, wherein the wing forward frame includes one or more spherical bearings, each spherical bearing configured to slidably engage a respective pin of the one or more pins.

B29. The aerial vehicle of paragraph B27, wherein the longitudinal axis of the one or more pins is substantially aligned with a longitudinal axis of the tank.

B30. The aerial vehicle of paragraph B27, wherein the one or more pins react only Z-axis and Y-axis loads between the substructure and the wing forward frame.

B31. The aerial vehicle of paragraph B1, wherein the tank is a pressure vessel.

B32. The aerial vehicle of paragraph B1, wherein the fairing assembly further comprises a fairing having a fairing skin coupled to the substructure, wherein the thermal protection system is coupled to the fairing skin.

C1. A method for coupling a fairing assembly to an aerial vehicle having a tank that forms a body of the vehicle and a wing coupled to the tank, the method comprising:

coupling a substructure of the fairing assembly to the tank so that tank reaction loads, resulting from the fairing assembly, are hoop-wise reaction loads;

coupling a thermal protection system to the substructure; and coupling a seal assembly to the substructure so that the seal assembly overlaps at least a portion of an edge of the wing.

C2. The method of paragraph C1, wherein coupling the substructure to the tank comprises coupling at least one strut to the substructure and the tank where the at least one strut is bonded to a tank skin of the tank.

C3. The method of paragraph C2, wherein coupling the substructure to the tank further comprises coupling a coupling bracket to the tank skin by bonding the coupling bracket to the tank skin so that a coupling member of the coupling bracket slidably engages the substructure.

C4. The method of paragraph C1, wherein coupling the substructure to the tank further comprises coupling the substructure to a wing forward frame of the wing with at least one pin that slidably engages the wing forward frame.

C5. The method of paragraph C1, wherein coupling the seal assembly to the substructure comprises coupling one or more seal members to a fairing skin and coupling the fairing skin to the substructure.

C6. The method of paragraph C5, wherein coupling the fairing skin to the substructure includes coupling the fairing skin to the substructure with blind installed fasteners.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A fairing assembly for an aerial vehicle, the aerial vehicle comprising a tank, which forms a body of the aerial vehicle and a wing, coupled to the tank and comprising an edge, the fairing assembly comprising:
- a substructure configured to couple with a tank skin of the tank;
- a thermal protection system coupled to the substructure and spaced away from the wing by a dynamically variable gap; and
- a seal assembly coupled to the substructure, and wherein the seal assembly comprises:
  - a lap seal, which comprises an inner surface that overlaps at least a portion of the edge of the wing; and
  - a pressure seal, movable with the wing, located between the wing and the inner surface of the lap seal, and compressed against the inner surface of the lap seal; and
- relative movement between the lap seal and the pressure seal seals the dynamically variable gap between the thermal protection system and the wing.

2. The fairing assembly of claim 1, wherein the seal assembly forms a dynamic seal between the thermal protection system and the wing so as to provide for relative movement between the wing and the thermal protection system.

3. The fairing assembly of claim 1, wherein the seal assembly forms a dynamic seal between the thermal protection system and the wing so as to provide for relative movement between the wing and the tank.

4. The fairing assembly of claim 1, wherein the thermal protection system is coupled to the tank skin.

5. The fairing assembly of claim 1, wherein the seal assembly is coupled to the thermal protection system.

6. The fairing assembly of claim 1, wherein the lap seal overlaps the portion of the edge of the wing.

7. The fairing assembly of claim 6, wherein the seal assembly includes a barrier member disposed between the lap seal and a skin of the wing.

8. The fairing assembly of claim 1, further comprising a retaining member, movable with the wing, located between the wing and the inner surface of the lap seal to maintain a position of the pressure seal relative to the lap seal.

9. An aerial vehicle comprising:
- a tank, forming at least a portion of a body of the aerial vehicle, the tank comprising a tank skin;
- a wing, coupled to the tank, the wing comprising a wing skin and an edge that is at least partially defined by the wing skin; and
- a fairing assembly, coupled to the tank adjacent the edge of the wing, the fairing assembly comprising:
  - a substructure configured to couple with the tank skin;
  - a thermal protection system coupled to the substructure and spaced away from the wing by a dynamically variable gap; and
  - a seal assembly coupled to the substructure, and wherein the seal assembly comprises:
    - a lap seal, which comprises an inner surface that overlaps at least a portion of the edge of the wing; and
    - a pressure seal, movable with the wing, located between the wing and the inner surface of the lap seal, and compressed against the inner surface of the lap seal; and
  - relative movement between the lap seal and the pressure seals the dynamically variable gap between the thermal protection system and the wing.

10. The aerial vehicle of claim 9, further comprising a mounting system configured to couple the substructure to the tank so that tank reaction loads, resulting from the fairing assembly, are hoop-wise reaction loads.

11. The aerial vehicle of claim 10, wherein the mounting system comprises at least one strut configured to couple the substructure to the tank skin, wherein the at least one strut is configured to react only Z-axis loads and Y-axis loads between substructure and tank skin.

12. The aerial vehicle of claim 10, wherein the mounting system further comprises a coupling bracket configured to couple the substructure to the tank skin, wherein the coupling bracket is configured to react only X-axis loads and Y-axis loads between substructure and tank skin.

13. The aerial vehicle of claim 9, wherein:
- the edge of the wing is further defined by a wing forward frame; and
- the substructure includes one or more pins, the one or more pins being configured to slidably engage the wing forward frame so that the wing moves relative to the substructure along a longitudinal axis of the one or more pins.

14. The aerial vehicle of claim 13, wherein the wing forward frame includes one or more spherical bearings, each spherical bearing configured to slidably engage a respective pin of the one or more pins.

15. The aerial vehicle of claim 13, wherein the longitudinal axis of the one or more pins is substantially aligned with a longitudinal axis of the tank.

16. The aerial vehicle of claim 13, wherein the one or more pins react only Z-axis and Y-axis loads between the substructure and the wing forward frame.

17. A method for coupling a fairing assembly to an aerial vehicle, the aerial vehicle comprising a tank, which forms a body of the aerial vehicle and a wing, coupled to the tank and comprising an edge, the method comprising steps of:

coupling a substructure of the fairing assembly to the tank so that tank reaction loads, resulting from the fairing assembly, are hoop-wise reaction loads;

coupling a thermal protection system, spaced away from the wing by a dynamically variable gap, to the substructure; and coupling a seal assembly to the substructure, and wherein the seal assembly comprises a pressure seal and a lap seal, the lap seal comprising an inner surface, and wherein the inner surface of the lap seal overlaps at least a portion of the edge of the wing, and the pressure seal moves with the wing and is located between the wing and the inner surface of the lap seal, and is compressed against the inner surface of the lap seal; and relative movement between the lap seal and the pressure seal seals the dynamically variable gap between the thermal protection system and the wing.

18. The method of claim 17, wherein:

the step of coupling the substructure to the tank comprises coupling at least one strut to the substructure and to the tank; and the at least one strut is chemically bonded to a tank skin of the tank to prevent creation of one or more of leak paths and stress concentrations.

19. The method of claim 18, wherein the step of coupling the substructure to the tank further comprises coupling a coupling bracket to the tank skin by chemically bonding the coupling bracket to the tank skin so that a coupling member of the coupling bracket slidably engages the substructure and the bonding prevents creation of one or more of leak paths and stress concentrations.

20. The method of claim 17, wherein the step of coupling the substructure to the tank further comprises coupling the substructure to a wing forward frame of the wing with at least one pin that slidably engages the wing forward frame.

* * * * *

UNITED STATES PATENT AND TRADEMARK OFFICE

CERTIFICATE OF CORRECTION

PATENT NO. : 10,773,788 B2
APPLICATION NO. : 15/677789
DATED : September 15, 2020
INVENTOR(S) : Best et al.

It is certified that error appears in the above-identified patent and that said Letters Patent is hereby corrected as shown below:

On the Title Page

Item (57) Abstract, third line "fining" should be "fairing".

Signed and Sealed this
Twenty-first Day of February, 2023

Katherine Kelly Vidal

Katherine Kelly Vidal
*Director of the United States Patent and Trademark Office*